(12) United States Patent
Ben-Bassat et al.

(10) Patent No.: US 6,535,545 B1
(45) Date of Patent: Mar. 18, 2003

(54) RF MODEM UTILIZING SAW RESONATOR AND CORRELATOR AND COMMUNICATIONS TRANSCEIVER CONSTRUCTED THEREFROM

(75) Inventors: David Ben-Bassat, Yehud (IL); Moshe Lerner, Petach Tikva (IL)

(73) Assignee: RF Waves Ltd., Or Yehuda (IL)

( * ) Notice: Subject to any disclaimer, the term of this patent is extended or adjusted under 35 U.S.C. 154(b) by 0 days.

(21) Appl. No.: 09/419,824

(22) Filed: Oct. 15, 1999

(51) Int. Cl.[7] .......................... H04B 15/00; H04K 1/00; H04L 27/30
(52) U.S. Cl. ...................................... 375/142
(58) Field of Search ........................ 375/130, 140–143, 375/146, 147, 150, 151, 153, 219, 222

(56) References Cited

U.S. PATENT DOCUMENTS

| | | |
|---|---|---|
| 3,188,578 A | 6/1965 | Winsor, III |
| 4,602,220 A | 7/1986 | Kurihara |
| 4,703,327 A | 10/1987 | Rossetti et al. |
| 4,746,830 A | 5/1988 | Holland |
| 4,926,440 A * | 5/1990 | Mikoshiba et al. ......... 375/145 |
| 5,177,767 A * | 1/1993 | Kato .......................... 375/142 |
| 5,243,622 A * | 9/1993 | Lux et al. ................... 375/147 |
| 5,434,893 A | 7/1995 | LeRoy et al. |
| 5,469,170 A | 11/1995 | Mariani |
| 5,500,872 A * | 3/1996 | Kinney et al. .............. 375/150 |
| 5,617,871 A | 4/1997 | Burrows |
| 5,677,928 A * | 10/1997 | Rizzo et al. ................ 375/134 |
| 5,784,403 A | 7/1998 | Scott |
| 5,786,764 A | 7/1998 | Engellenner |
| 5,825,806 A | 10/1998 | Tuttle et al. |
| 5,844,482 A | 12/1998 | Guthrie et al. |
| 5,850,187 A | 12/1998 | Carrender et al. |
| 5,850,392 A | 12/1998 | Wang et al. |
| 5,874,896 A | 2/1999 | Lowe et al. |
| 5,892,792 A | 4/1999 | Walley |
| 5,909,461 A | 6/1999 | Koga et al. |
| 5,910,956 A | 6/1999 | Guthrie et al. |
| 5,912,644 A | 6/1999 | Wang |
| 5,912,921 A | 6/1999 | Warren et al. |

FOREIGN PATENT DOCUMENTS

| | | |
|---|---|---|
| EP | 0700154 | 3/1996 |
| WO | 9627957 | 9/1996 |

OTHER PUBLICATIONS

Digital Communications, pp583–584, 636–637.

* cited by examiner

Primary Examiner—Jean Corrielus
(74) Attorney, Agent, or Firm—Howard Zaretsky

(57) ABSTRACT

A bidirectional direct sequence spread spectrum half-duplex RF modem which can be applied to transmit and receive numerous types of analog and digital pulse modulation. The modem incorporates two different SAW devices fabricated on a single monolithic substrate. A first SAW device is used as a resonator in the oscillator circuit while a second SAW device is used as the correlator for transmit and receive operations. The RF modem operates as an analog or digital pulse transmitter and receiver and is adapted to be generic and versatile enough to be used in many different types of data communication systems, such as OOK, PWM and PPM. The RF modem can be used as the physical (PHY) layer in a layered communication system such as the ISO OSI communication stack. In an alternative embodiment, the transmission bit rate is increased using a plurality of correlators wherein each is configured with a unique function (i.e., code) that is orthogonal with all other functions.

37 Claims, 14 Drawing Sheets

RF MODEM UTILIZING SAW RESONATOR AND CORRELATOR AND COMMUNICATIONS TRANSCEIVER CONSTRUCTED THEREFROM

FIELD OF THE INVENTION

The present invention relates generally to a Radio Frequency (RF) modem and more particularly to a spread spectrum RF modem that utilizes SAW devices for the resonator during transmission and the correlator during receiving and transmitting, both SAW devices fabricated on the same monolithic substrate.

BACKGROUND OF THE INVENTION

As the use of computers continues to increase at a rapid rate, the demand for peripherals and systems connected via wireless connections continues to increase. The number of wireless of applications is currently increasing at a very high rate in areas such as security alarms, networking, data communications, telephony and computer security.

Wireless communications currently may take many forms such as ultrasonic, IR and RF. A commonly used communication technique in RF wireless communications is spread spectrum. Spread spectrum communication is a communication technique whereby the transmitted signal is spread over a frequency band that is significantly wider than the minimum bandwidth required to transmit the information being sent. As a result of the signal spreading, spread spectrum systems have reduced susceptibility to interference and jamming thus enabling high levels of data integrity and security. Further, since the signal spreading process spreads the transmission power over a wide bandwidth, the power levels at any given frequency within the bandwidth are reduced significantly thereby reducing interference to other radio devices.

Spread spectrum communication systems are generally of the direct sequence (DS) type, the frequency hopping (FH) type or are a hybrid of the two that combine DS and FH. In direct sequence spread spectrum communications, a data signal is modulated with a pseudo random chip code so as to generate a transmitted signal whose frequency spectrum is spread over a wide bandwidth. The transmitted signal has a low spectral density and appears as noise to receivers lacking the code sequence. Thus, spread spectrum communications provides increased security for the data transmitted and reduced interference with other transmitters and receivers operating in the same environment.

The role of the transmitter in a spread spectrum communications system is to spread the signal in accordance with the data to be transmitted. Each bit or set of bits to be transmitted is converted into a plurality of chips having a much wider bandwidth than the original data. The spreading is performed in accordance with the code sequence chosen for the system.

The role of the receiver is to despread the spread spectrum signal in order to recover the original data signal. In direct sequence spread spectrum, the despreading of the signal is accomplished by correlating the received signal with a reference code matching the pseudo noise code used by the transmitter to transmit the information. As a consequence of de-spreading the signal, any interfering signals are also spread. The interfering signals typically comprise pseudo-random noise rather than cyclic noise that is easier to combat.

One technique for spread spectrum correlation is to convert the received signal into digital form before inputting it to a digital matched filter. Other spread spectrum correlation techniques utilize surface acoustic wave (SAW) devices to perform correlation on a received spread spectrum signal. SAW devices are thin film planar devices that permit propagation of acoustical waves on the free surface. The SAW device functions to convert electrical signals into acoustical signals and back again via piezo electric transducers.

SAW devices are useful in a variety of applications including spread spectrum correlators since they are generally capable of operating over a wide bandwidth. A SAW correlator device is a passive component constructed to recognize a specific sequence of code chips (similar in operation to a digital matched filter correlator) via correlation of phase shifts in an RF signal. The SAW correlator functions analogously to a delay line matched filter. It consists of many delay elements each having a delay period equal to the period of the transmitted code clock such that, at any time, each element corresponds to a single chip of the received signal.

As the received signal propagates down the SAW device, the phase structure of each element is added in or out of phase with the propagated wave. The outputs of all the elements may be summed to reach a maximum at a total correlation value. When the phase shift structure of all the elements matches the phase shifts of the propagated wave, a maximum sum, i.e., correlation, is achieved.

Since SAW devices are by nature fixed devices, a SAW correlator is usually programmed at the time of manufacture to match a single predetermined chip code sequence. The phase shift structure of the SAW device is programmed at the time of construction through transducers placed in each element to produce an elemental phase match and cannot be changed once manufactured thereby permitting correlation with a single code sequence.

It would therefore be desirable to have a RF modem that utilizes direct sequence spread spectrum techniques that can be constructed at low cost and small size. It is also desirable that such a RF modem utilize SAW devices for both the transmitter resonator, correlator and receiver correlator thereby reducing the size and cost of the modem.

SUMMARY OF THE INVENTION

The present invention is a bidirectional direct sequence spread spectrum half-duplex RF modem. The RF modem can be applied to transmit and receive numerous types of analog and digital pulse modulation. While the RF modem can be adapted to operate in numerous frequency ranges, an example is presented herein that is constructed to operate in the 902 to 928 Industrial, Scientific and Medical (ISM) band of frequencies. In addition, examples are provided that utilize the RF modem of the present invention to construct various types of data communications systems.

A key feature of the present invention is the incorporation in the RF modem of two different Surface Acoustic Wave (SAW) devices fabricated on a single monolithic substrate. A first SAW device is used as the resonator in the oscillator portion of the transmitter while a second SAW device forms the correlator for use in both the transmit and receiver portions of the modem. Another key feature of the invention is the very low amount of power consumed by the modem.

The RF modem is constructed to operate as a pulse transmitter and receiver. It is adapted to be generic in the sense that it is versatile enough to be used in many different types of data communication systems, several examples of which are presented below. The RF modem can be used as the physical (PHY) layer in a layered communication system such as the ISO OSI communication stack. As an example, the pulse transmitter RF modem, can be used to provide various modulation schemes including, but not limited to On/Off Keying (OOK), Pulse Width Modulation (PWM), Pulse Position Modulation (PPM) or any other type of analog or digital pulse modulation.

The transmit portion of the modem comprises an oscillator that uses a SAW resonator device. The output of the oscillator is switched on and off in accordance with the data to be transmitted. The pulse is input to the SAW correlator that functions to output the spreading waveform comprising a code sequence. Effectively, the SAW correlator functions as a BPSK modulator. The code sequence used is a 13-bit Barker code that is adapted to have high autocorrelation properties. The spreading sequence is amplified and transmitted via an antenna.

At the receiver, the received signal is first filtered by a band pass filter before being amplified by a Low Noise Amplifier (LNA). The amplified signal is input to the matched filter/correlator where a match with the Barker code sequence is detected. If a match is detected, a de-spreading pulse is output representing the original pulse. The output of the correlator is input to a peak detector that functions to detect, in a either a linear or non-linear fashion the envelope of the received signal. A dynamic reference signal is generated and -used to bias the threshold used to generate the binary output data signal.

The output power $P_T$ of the RF modem of the present invention is approximately 10 dBm. The processing gain is approximately 11 dB. In accordance with the FCC, providing a processing gain of at least 10 dB using direct sequence spread spectrum techniques permits the use of the higher output power level of 30 dBmi. Together, the effective output power $P_{TEFF}$ is on the order of 20 dBm. This translates to a maximum distance of communication (depending on actual conditions) of approximately 1000 meters. The maximum pulse rate achievable with the example RF modem presented herein constructed in accordance with the present invention is approximately 1.5 Mpps.

In an alternative embodiment, the transmission bit rate is increased by using a plurality of correlators wherein each is configured with a unique function (i.e., code) that is orthogonal with all other functions, i.e., they have near zero cross correlations with each other. The host is adapted to provide N data input and output lines. Each correlator having its own data input and output signal lines. The oscillator signal is generated by an oscillator circuit common to all correlators. An RF power splitter/combiner functions to combine the N transmission signals into a combined transmission signal and to split the received combined signal into multiple receive signals that are then fed to each correlator.

The RF modem of the present invention has a benefit of being relatively inexpensive to implement for the following reasons: (1) the size of both the required silicon and the SAW resonator and correlator devices are relatively small resulting in inexpensive manufacturing and high yield; (2) the high yield, as well as the simplicity of the devices, results in relatively simple testing of the components; and (3) the size of the resulting dies enables standard, inexpensive packaging.

The use of direct sequence spread spectrum technique provides numerous advantages, including the following: (1) the modem is adapted to transmit and receive very narrow pulses which is very desirable for pulse transceiving; (2) 10 dB is added to the effective transmission power per pulse due to the spread spectrum processing gain; (3) inherent immunity to interference; (4) inherent filtering of out of band noise; (5) inherent spreading of in-band noise; (6) a higher dynamic range available for communication; and (7) power savings resulting from fast oscillator wake-up time.

There is provided in accordance with the present invention a direct sequence spread spectrum radio frequency (RF) modem comprising an oscillator having a resonator and adapted to generate an oscillator signal, the center frequency of the oscillator determined by the center frequency of the resonator, switching means for gating the oscillator signal in accordance with input data to be transmitted so as to generate a series of pulses, spreading means for spreading the pulse output of the switching means with a spreading code sequence waveform so as to generate a spread spectrum transmission signal, means for transmitting the spread spectrum transmission signal, means for receiving the spread spectrum transmission signal, correlator means adapted to de-spread the spread spectrum transmission signal in accordance with the code sequence so as to generate a correlator signal, detection means for detecting the envelope of the correlator signal so as to generate a detection signal and decision means for applying a threshold to the detection signal so as to generate an output data signal therefrom.

The resonator comprises a surface acoustic wave (SAW) resonator. The switching means comprises a plurality of switches coupled in series and operative to provide a high level of electrical isolation. The plurality of switches may comprise a plurality of Field Effect Transistor (FET) switches. The spreading means comprises a surface acoustic wave (SAW) matched filter/correlator. The spreading code sequence comprises a Barker code series sequence, e.g., the 13-chip Barker sequence $\{1, 1, 1, 1, 1, -1, -1, 1, 1, -1, 1, -1, 1\}$.

The means for transmitting comprises an output amplifier for amplifying the spread spectrum transmission signal and an antenna coupled to the output of the output amplifier. The means for receiving comprises an antenna adapted to receive RF signals, a band pass filter coupled to the antenna and a low noise amplifier coupled to the output of the band pass filter. The correlator means comprises a surface acoustic wave (SAW) matched filter/correlator. The SAW matched filter/correlator is configured with a Barker code series sequence, e.g., the 13-chip Barker sequence $\{1, 1, 1, 1, 1, -1, -1, 1, 1, -1, 1, -1, 1\}$.

The spreading means and the correlator means share a surface acoustic wave (SAW) correlator adapted to be used half-duplex for transmission and receiving. The resonator means comprises a surface acoustic wave (SAW) resonator while the spreading means and the correlator means share a surface acoustic wave (SAW) correlator adapted to be used half duplex for transmission and receiving and wherein the SAW resonator and the SAW correlator are constructed on the same monolithic substrate. The detection means comprises a slow peak detector adapted to generate a slowly varying reference signal and a fast peak detector adapted to track the envelope of the correlator signal and to generate the detection signal therefrom. The decision means is adapted to generate a binary output signal in accordance with the detection signal applied against a threshold. The detection means is adapted to generate the threshold dynamically in accordance with the correlator signal.

There is further provided in accordance with the present invention a method of modulating and demodulating direct sequence spread spectrums, the method comprising the steps of generating an oscillator signal utilizing a resonator wherein the frequency of oscillation is determined by the center frequency of the resonator, gating the oscillator signal in accordance with input data to be transmitted so as to generate a series of pulses, spreading the pulses utilizing a spreading code sequence waveform so as to generate a spread spectrum transmission signal, transmitting the spread spectrum transmission signal, receiving the spread spectrum transmission signal, de-spreading the spread spectrum transmission signal in accordance with the code sequence so as to generate a correlator signal, detecting the envelope of the correlator signal so as to generate a detection signal and applying a threshold to the detection signal so as to generate an output data signal therefrom.

There is also provided in accordance with the present invention a direct sequence spectrum radio frequency (RF) modem comprising an oscillator having a resonator and adapted to generate an oscillator signal, the center frequency of the oscillator determined by the center frequency of the resonator, a plurality of N transmit/receive circuits, each the transmit/receive circuit comprising switching means for gating the oscillator signal in accordance with input data to be transmitted so as to generate a series of pulses, spreading means for spreading the pulse output of the switching means with a spreading code sequence waveform so as to generate a spread spectrum transmission signal, correlator means adapted to de-spread a spread spectrum receive signal in accordance with the code sequence so as to generate a correlator signal, detection means for detecting the envelope of the correlator signal so as to generate a detection signal and decision means for applying a threshold to the detection signal so as to generate an output data signal therefrom, wherein the correlator in each transmit/receive circuit is configured with a unique function substantially orthogonal to functions in other correlators, means for combining and transmitting the N spread spectrum transmission signals generated by the N transmit/receive circuits as a combined spread spectrum transmission signal, means for receiving and splitting the combined spread spectrum transmission signal into N spread spectrum receive signals and wherein N is a positive integer.

The means for combining the N spread spectrum transmission signals comprises an RF power combiner splitter and the means for splitting the combined spread spectrum signal comprises an RF power combiner splitter.

There is still further provided in accordance with the present invention a method of modulating and demodulating N direct sequence spread spectrum signals, each direct sequence spread spectrum signal associated with one of N channels, the method comprising the steps of generating N oscillator signals utilizing a resonator wherein the frequency of oscillation is determined by the center frequency of the resonator, for each channel: gating each oscillator signal in accordance with input data for the $N^{th}$ channel to be transmitted so as to generate a series of pulses, spreading the pulses utilizing a spreading code sequence waveform so as to generate a spread spectrum transmission signal, the spreading code sequence waveform for the $N^{th}$ channel substantially orthogonal with the spreading code sequence waveforms of all other channels, de-spreading a spread spectrum transmission receive signal in accordance with the code sequence so as to generate a correlator signal, detecting the envelope of the correlator signal so as to generate a detection signal and applying a threshold to the detection signal so as to generate an output data signal therefrom, combining and transmitting the N spread spectrum transmission signals as a combined spread spectrum transmission signal, receiving and splitting the combined spread spectrum transmission signal into N spread spectrum receive signals and wherein N is a positive integer.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| BPF | Band Pass Filter |
| BPSK | Binary Phase Shift Keying |
| CMOS | Complementary Metal Oxide Semiconductor |
| DC | Direct Current |
| DS | Direct Sequence |
| FCC | Federal Communications Commission |
| FET | Field Effect Transistor |
| FH | Frequency Hopping |
| FM | Frequency Modulation |
| IL | Insertion Loss |
| IR | Infra Red |
| ISI | Intersymbol Interference |
| ISM | Industrial, Scientific and Medical band |

-continued

| Term | Definition |
| --- | --- |
| ISO | International Standard Organization |
| LNA | Low Noise Amplifier |
| MOSFET | Metal Oxide Semiconductor Field Effect Transistor |
| NF | Noise Figure |
| OOK | On/Off Keying |
| OSI | Open Systems Interconnection |
| PC | Personal Computer |
| PPM | Pulse Position Modulation |
| PWM | Pulse Width Modulation |
| RF | Radio Frequency |
| S/H | Sample and Hold |
| SAW | Surface Acoustic Wave |
| SNR | Signal to Noise Ratio |

RF Modem General Description

The present invention is a bidirectional direct sequence spread spectrum half-duplex RF modem. The RF modem can be applied to transmit and receive numerous types of analog and digital pulse modulation. While the RF modem can be adapted to operate in numerous frequency ranges, an example is presented herein that is constructed to operate in the 902 to 928 Industrial, Scientific and Medical (ISM) band of frequencies. It is not intended that the present invention be limited to such an implementation, as one skilled in the art can apply the principles of the present invention to construct an RF modem having other frequencies of operation. In addition, examples are provided that utilize the RF modem of the present invention to construct various type of data communications systems.

Several key features of the present invention include: (1) the incorporation in the RF modem of two different Surface Acoustic Wave (SAW) devices fabricated on a single monolithic substrate whereby a first SAW device is used to form the resonator in the transmitter portion of the modem while a second SAW device is used to form the correlator in the transmitter and receiver portion of the modem; (2) the very low amount of power consumed by the modem; (3) the very narrow pulse that is received during operation which results in improved SNR; and (4) the effective energy per bit transmitted is 10 dB above the transmitter energy, due to the processing gain of the modem.

Figure 1:
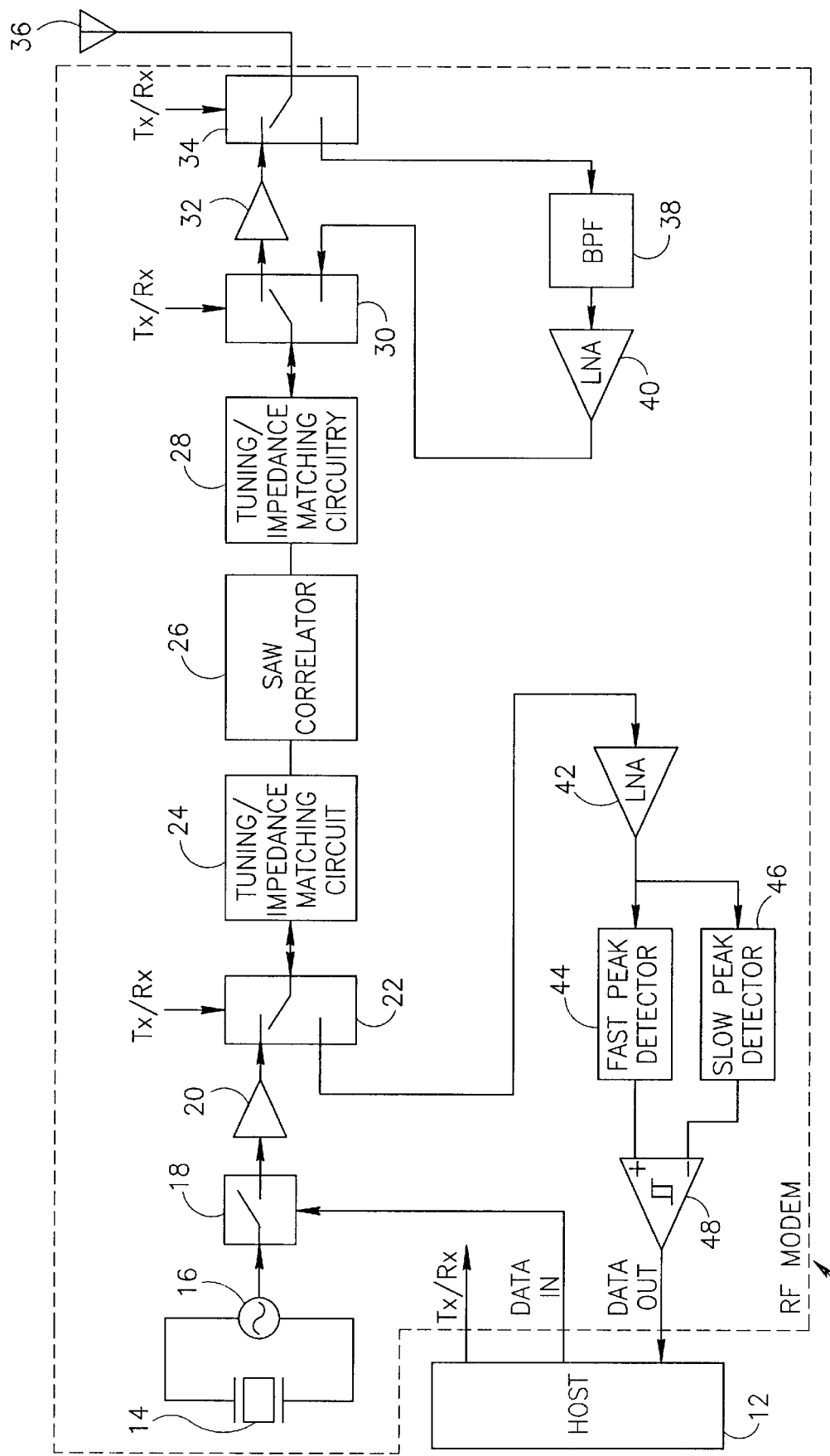
FIG. 1 is a block diagram illustrating an RF modem constructed in accordance with the present invention.

A block diagram illustrating an RF modem constructed in accordance with the present invention is shown in FIG. 1. The RF modem, generally referenced 10, comprises a transmit portion and a receiver portion. A portion of the circuitry is used by both the transmitter and the receiver, namely the SAW Correlator device circuitry.

The RF modem 10 is constructed to operate as a pulse transmitter and receiver. It is adapted to be generic in the sense that it is versatile enough to be used in many different types of data communication systems, several examples of which are presented hereinbelow. The RF modem can be used as the physical (PHY) layer in a layered communication system such as the ISO OSI communication stack. As an example, the pulse transmitter RF modem 10, can be used to construct the following types of communication systems: On/Off Keying (OOK), Pulse Width Modulation (PWM), Pulse Position Modulation (PPM) or any other type of digital pulse modulation. Note that one skilled in the art can apply the RF modem of the present invention to construct other types of pulse modulation based communication systems as well. The transmit path of the RF modem will be described first followed by the receive path.

Transmit Path

The transmitter path comprises a resonator 14, oscillator 16, RF switch 18, amplifier 20, a first Tx/Rx switch 22, a first tuning/impedance matching circuit 24, SAW correlator 26, a second tuning/impedance matching circuit 28, a second Tx/Rx switch 30, output amplifier 32, a third Tx/Rx switch 34 and antenna 36. The data to be transmitted is provided by a host 12 and is input to the control input of the RF switch 18. In this example, the host 12 is the source of the data to be transmitted. The host may comprise any suitable digital data source such as a microcontroller, microprocessor, microcomputer, PC or other data computing means. The data rate output of the host can be any rate that the transmitter can support. In the example modem described herein, the data rate output from the host is a maximum of 1.5 Mbps. This assumes a correlator chip rate of 20 Mcps or 50 ns/chip. Using a 13-chip spreading code sequence to spread the pulse yields 13*50=650 ns/pulse. Thus, the highest pulse rate is $$\frac{1}{650 \text{ ns}} \cong 1.5 \text{ Mbps}.$$

The RF modem operates as a pulse transmitter/receiver wherein a signal output by the oscillator 16 is modulated in on/off fashion by the RF switch 18. The oscillator 16 is driven by a resonator 14 that comprises a SAW device. Various types of frequency sources can be used with the invention such as crystal oscillators, ceramic resonators, etc. A SAW based resonator, however, provides a good compromise between size, cost and performance. In this example, the center frequency of the SAW resonator is preferably 915 MHz with an accuracy of $\Delta f=0.1$ MHz. This frequency is in the middle of the 902 to 928 ISM band. Note that the invention can be adapted by one skilled in the art to operate in other frequency bands as well such as the 2.4 GHz ISM band. The quality factor (Q) is preferably such that the resonator 3 dB bandwidth is $\Delta f<10$ MHz. The insertion loss (IL) is preferably IL<3 dB at the center frequency while the impedance $Z_o$ at the center frequency is less then 50 Ohm.

The SAW resonator 14 is coupled to an oscillator circuit 16 whose center frequency $f_c$ is 915 MHz with an accuracy of $\Delta f=\pm0.1$ MHz. The 'wake up time' of the oscillator is preferably such that the output of the oscillator stabilizes (in terms of center frequency and output power) within 100 $\mu$s from the time its power supply voltage (e.g., 3 V) is applied. The signal output of the oscillator is relatively low power, e.g., −30 dB and must be amplified.

In accordance with the frequency range of the example modem described herein, the oscillator is required to oscillate in a frequency range between 905 to 925 MHz. This range is approximately the bandwidth of the, correlator, Consequently, this means that the resonator requires a Q of $\approx 20/900 \approx 2.2\%$. This is a relatively low Q, and is desirable as it permits a very short 'wake up time' for the oscillator. The use of a low Q resonator with short wake up time and a wideband correlator result in significant energy savings.

Before being amplified, the signal is input to the switch 18 adapted to create short pulses of carrier wave signal. The pulse durations are approximately within a range of 0.5 to 2 chips (i.e., 25 to 100 ns). The RF switch 18 is adapted to provide high isolation of at least 50 dB from input to output when not in an 'on' state. The input impedance of the switch is preferably no lower than 10k Ohm and no higher than 5 pF. The output impedance is preferably 50 Ohm. A positive input on the control input on the DATA IN signal puts the switch in the on or conducting state. Alternatively, the switch can be adapted to turn on when a negative or zero signal is input to the control input.

Thus, in response to the DATA IN signal, the switch is adapted to output a low power pulse carrier signal, i.e., an interrogating pulse, whose width is within a range of approximately 0.5 to 2 chips (i.e., 25 to 100 ns). This signal is then amplified by the switched amplifier 20. The amplifier 20 is adapted to amplify the weak −30 dBm input signal output from the switch 18 to an output power of approximately 10 to 15 dBm. The central frequency of operation of the amplifier is 915 MHz with a bandwidth of at least 50 MHz. The output impedance is preferably 50 Ohm. The wake up time of the amplifier is preferably 100 ns, i.e., the amplifier is stable according to specification within 100 ns. The high gain of the amplifier 20 is required to overcome the insertion loss of the SAW correlator 26 that may be as high as 15 to 20 dB.

The output of the amplifier is input to a first Tx/Rx switch 22 which is controlled by a Tx/Rx control signal generated by the host 12 or other control/configuration means. A second Tx/Rx switch is placed after the second tuning/impedance matching circuit 28. Both first and second Tx/Rx switches function to switch the SAW correlator between the transmit path and the receive path.

A key feature of the RF modem of the present invention is that a single SAW correlator is used for both transmission and receiving. When the switch 18 is in the Tx state, the output of the amplifier 20 is input to the circuit 24. The circuit 24 functions to match the impedance at the output of the switch 22 to the SAW device such that the input impedance seen by the SAW device is 50 Ohms.

The SAW correlator device is operative to output a signal whose waveform is shaped in accordance with the configuration of the SAW device. As is described in more detail below, the SAW correlator is constructed to output a spread signal waveform that represents a 13 bit Barker code. Note that the modem may be constructed using other spread spectrum codes as well. In response to the input interrogating pulse from the tuning/impedance matching circuit 24, the SAW device is operative to output a spreading waveform much wider in time duration, e.g., 500 to 700 ns. The output of the SAW device is input to a second tuning/impedance matching circuit 28 which functions to provide a 50 Ohm output impedance. The insertion loss of the SAW correlator may be as high as 15 to 20 dB.

The output of the circuit 28 is input to a second Tx/Rx switch 30 which is controlled by a Tx/Rx control signal generated by the host or other control/configuration means. When the switch 30 is in the Tx state, the output of the impedance matching circuit 28 is input to an output amplifier 32. The output amplifier 32 is operative to have a gain of approximately 40 dB. This level of gain is necessary in order to amplify the attenuated output of the SAW correlator, e.g., −30 to −20 dBm, to a level of approximately 15 dBm. The input impedance of the amplifier 32 is preferably 50 Ohms. Note that amplifying the signal twice, i.e., 10 dB using amplifier 20 and 30 dB using amplifier 32, is preferable rather than using a single amplifier with larger gain. Due to the delay line effects of the SAW correlator 26, however, the two amplifiers 20, 32 are not turned on at the same time in order to avoid oscillations in the circuit. Note that amplifiers having switching times on the order of 10 to 20 ns are sufficient.

The output of the amplifier is input to a third Tx/Rx switch 34 which is controlled by a Tx/Rx control signal generated by the host or other control/configuration means. The Tx/Rx switches 22, 30, 34 are bidirectional and may comprise any suitable RF switch. When in the Tx state, the switch 32 is operative to couple the output of the amplifier 32 to the antenna 36. The antenna may comprise any suitable configuration including but not limited to printed dipole with balanced feed, printed sleeve dipole without unbalanced feed, printed monopole with unbalanced feed, monopole helical with unbalanced feed, printed notch with unbalanced feed, printed spiral with unbalanced feed, printed semi-loop, printed patch shorted to ground by vias or small loop.

Figure 2:
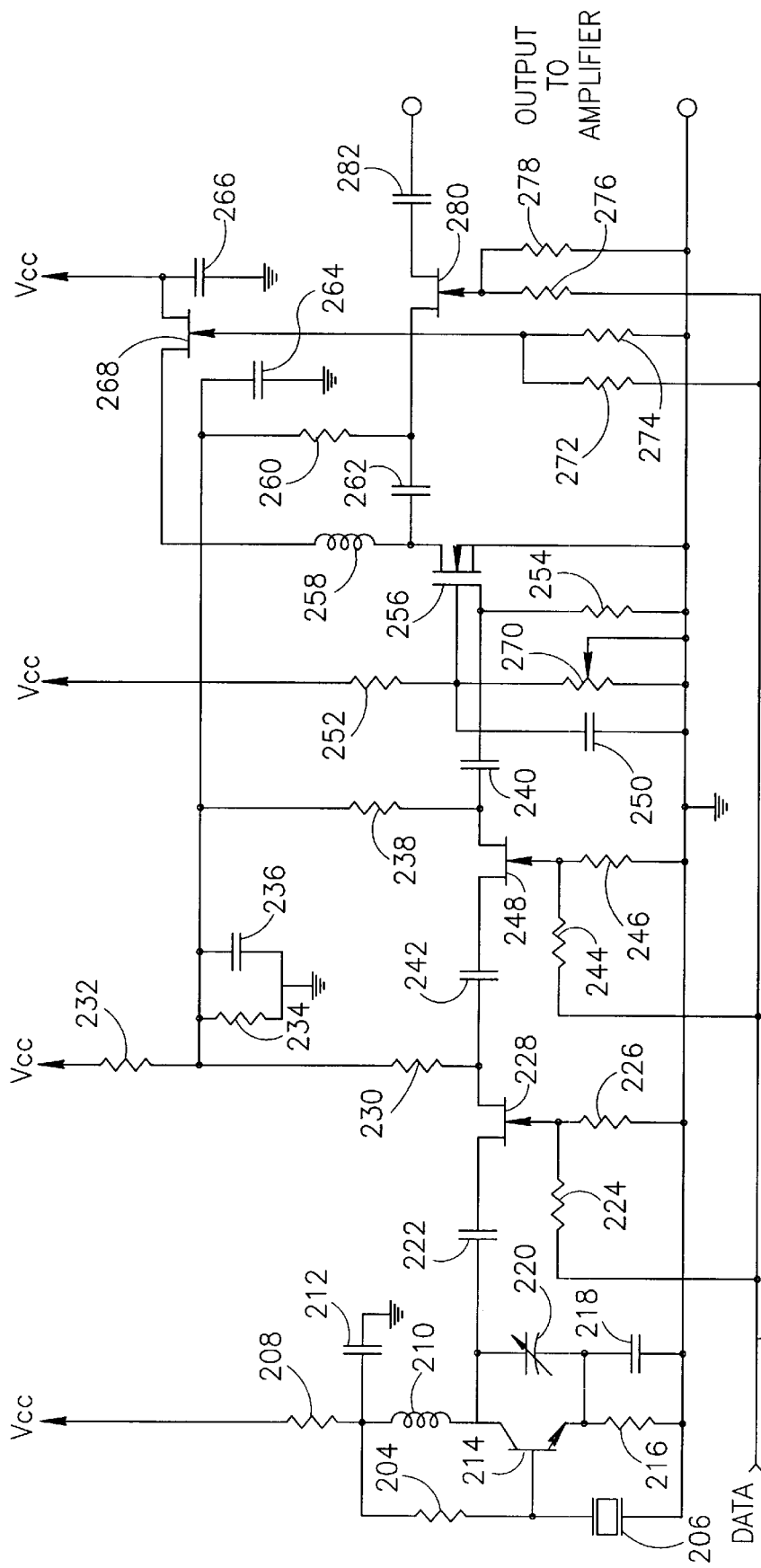
FIG. 2 is a schematic block diagram illustrating the resonator, oscillator and RF switch portion of the RF modem of the present invention.

A schematic block diagram illustrating the resonator, oscillator and RF switch portion of the RF modem of the present invention is shown in FIG. 2. As described hereinabove, the frequency source of the oscillator is a resonator 206 connected to the base of transistor 214. A biasing resister 204 is connected to Vcc through resister 208. The collector is connected to RF choke 210 and to capacitor 212 to ground. The RF choke and capacitor help isolate the RF energy from the power supply. The base of transistor 214 is coupled to a parallel combination of resister 216 and capacitor 218. The fixed capacitor 218 is connected is series to variable capacitor 220 connected across the collector. The resonator and transistor are adapted to form a negative impedance oscillator whose output is the signal on the collector. The transistor is configured to function as a positive feedback element in the circuit.

The resonator 206 may comprise any suitable resonator but is preferably a SAW resonator device whose center frequency determines the frequency of oscillation of the oscillator. The construction of the SAW resonator is described in more detail hereinbelow. The output of the oscillator is coupled via capacitor 222 to a first switch comprising FET transistor 228 whose gate is connected to ground via resister 226 and to a DATA IN signal via resistor 224. The source terminal is connected to Vcc via voltage divider comprising resisters 230, 232 coupled to RC comprising resister 234 and capacitor 236.

The output of FET 228 is coupled via coupling capacitor 242 to a second switch comprising FET transistor 248 whose gate is connected to ground via resister 246 and to the DATA IN signal via resistor 244. The source terminal is connected to Vcc via voltage divider comprising resisters 238, 232 coupled to RC comprising resister 260 and capacitor 264. Two cascaded switches are used in series to provide a high level of backward isolation when the switch is off. In the case when a single switch does not provide sufficient isolation, two switches effectively double the isolation. Such a series combination can provide on the order of 50 dB of isolation between input and output. In addition, the switch is adapted to open relatively quickly, i.e., on the order of 2 ns.

The output of the second switch is input to one gate of a double gate n-channel enhancement MOSFET 256 via capacitor 240 connected to ground via resister 254. The other gate is coupled to ground via capacitor 250 and to a voltage divider comprising fixed resister 252 connected to Vcc and variable resister 270 connected to ground. Transistor 256 is configured to amplify the oscillator signal. The source terminal of the transistor is connected to Vcc (coupled to ground via capacitor 266) via FET switch 268 and RF choke 258. The RF choke helps isolate the transistor 256 from the power supply for RF frequencies. The gate of FET switch 268 is connected to a voltage divider connected between the DATA IN signal and ground via resisters 272, 274. The FET switch 268 functions to control DC power to transistor 256. The switch is configured to conduct only when the data on the DATA IN line is a high (i.e., a '1') thus reducing the power consumption of the amplifier.

The output of the transistor 256 is coupled to an output FET switch 280 via coupling capacitor 262. The gate of the switch 280 is connected to a voltage divider connected between the DATA IN signal and ground via resisters 276, 278. The output of the switch is coupled to the amplifier stage 20 (FIG. 1) via coupling capacitor 282.

SAW Resonator and Correlator Devices

Figure 3:
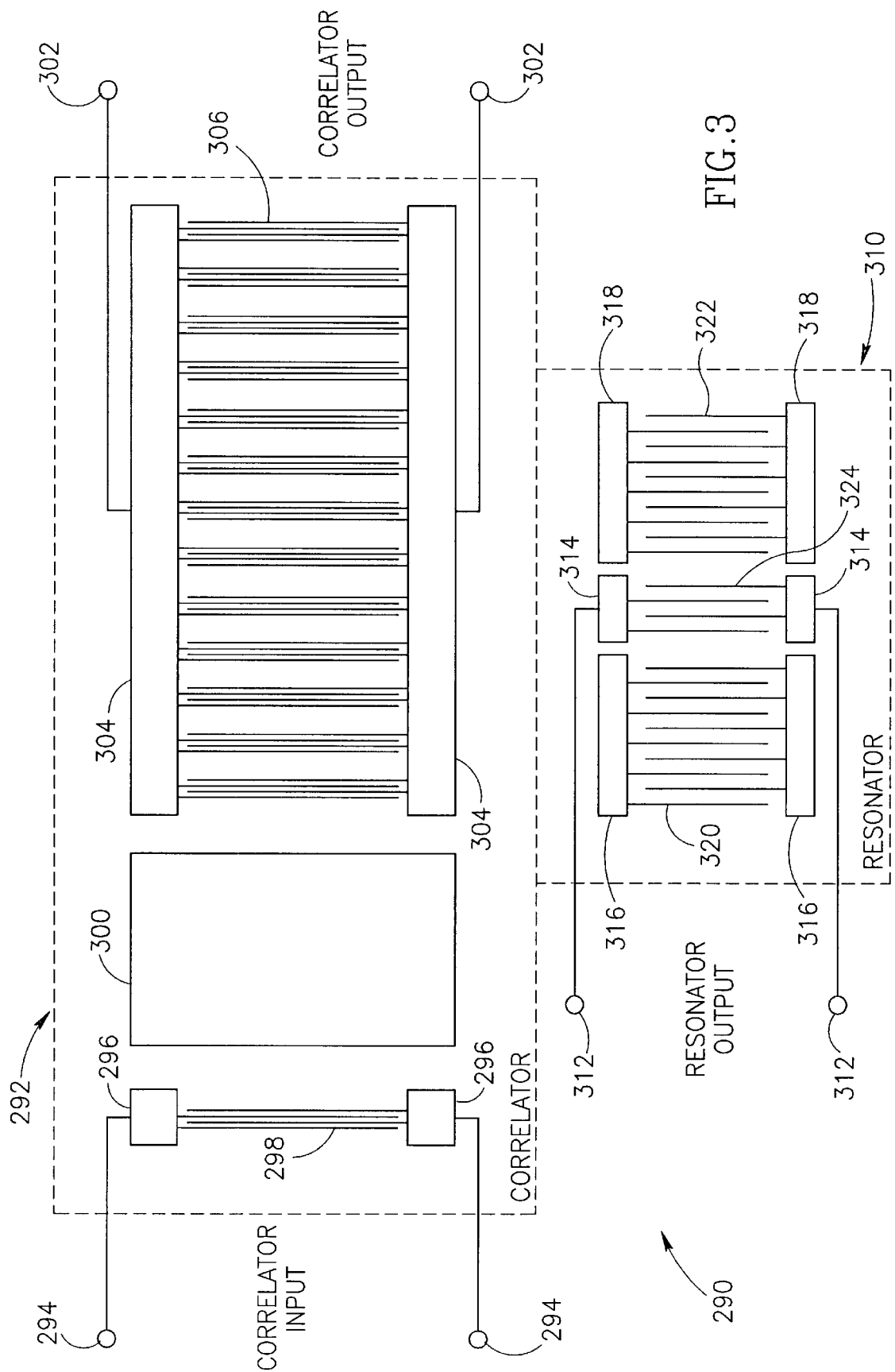
FIG. 3 is a pattern diagram illustrating the surface acoustic wave device of the present invention including a SAW resonator and SAW correlator.

The SAW resonator and correlator devices of the present invention will now be described in more detail. A pattern diagram illustrating the surface acoustic wave device of the present invention including a SAW resonator and SAW correlator is shown in FIG. 3. The SAW device 290 is constructed on a single piezoelectric substrate preferably made of quartz crystal, ST cut. The substrate may be constructed of materials other than quartz so long as the material used has acceptable temperature-stable properties. The SAW device 290 comprises two SAW components: a resonator 310 and a correlator 292. Both are described below in more detail beginning with the resonator. Note that the SAW resonator and correlator are adapted to fit onto a die size of approximately 6 mm$^2$.

The resonator 310, a two terminal device, is coupled to the oscillator circuit 16 (FIG. 1) and in more detail is shown coupled to the base of transistor 214 (FIG. 2). The resonator device 310 comprises input terminals 312 connected to signal electrodes 314, 316, 318. The signal electrodes 314, 316, 318 have comb shapes 324, 320, 322, respectively, for converting an electrical signal into surface acoustic waves. The two sets of signal electrodes, separated from each other by a predetermined distance, are operative to convert the surface acoustic waves into an electrical signal. Both signal electrodes are formed on the quartz crystal substrate using well known lithography techniques and are constructed of any suitable conductive material such as aluminum (Al), silver (Ag), gold (Au), copper (Cu) or the like having low electrical resistivity. Aluminum (Al) is preferable as it has the advantages of being low cost and etches easily.

The correlator 292 is a four terminal device adapted to function as a 13-bit BPSK correlator. The correlator is connected between the tuning/impedance matching circuits 24, (FIG. 1). The central frequency $f_c$ of the correlator is 915 MHz with an accuracy $\Delta f$ of ±0.1 MHz. The bit rate (i.e., chip rate) of the correlator is at least 20 Mbps. The input and output impedance of the correlator is adapted to be approximately 50 Ohm.

It is important to note that correlators having different codes, different rates, different frequencies of operation and using different modulations are known in the art and may be used with the RF modem of the present invention.

The correlator comprises input terminals 294 connected to input signal electrodes 296. The input electrodes have a comb shape 298 that functions to form an input transducer. A conductive surface 300 is placed in series with the input transducer and functions to absorb RF energy so as to help prevent RF leakage from the input to the output. Output signal electrodes 304 are placed in series with the absorbing surface 300. The output signal electrodes are connected to output terminals 302. The voltage developed across the output terminals 302 forms the output of the correlator. The output signal electrodes 304 have comb shapes 306 for converting an electrical signal into surface acoustic waves thus forming an output transducer.

The signal electrodes of the two input and output interdigital transducers, separated from each other by a predetermined distance, are operative to convert the surface acoustic waves into an electrical signal. The input and output signal electrodes and absorbing surface are formed on the quartz crystal substrate using well known lithography techniques and are constructed of any suitable conductive material such as aluminum (Al), silver (Ag), gold (Au), copper (Cu) or the like having low electrical resistivity. Aluminum (Al) is preferable as it has the advantages of being low cost and etches easily.

The input transducer and output transducer are formed on the piezoelectric substrate so as to function as a surface acoustic wave correlator, i.e., matched filter. The comb-like electrode pairs in the output transducer are formed to represent the Barker code used in the transmitter and receiver. The comb-like electrode pairs in the output transducer are formed at intervals corresponding to the chip rate. In the example RF modem presented herein, the correlator comprises 13 comb elements 306. Each comb element functions to either invert the phase or non invert it.

Figure 4:
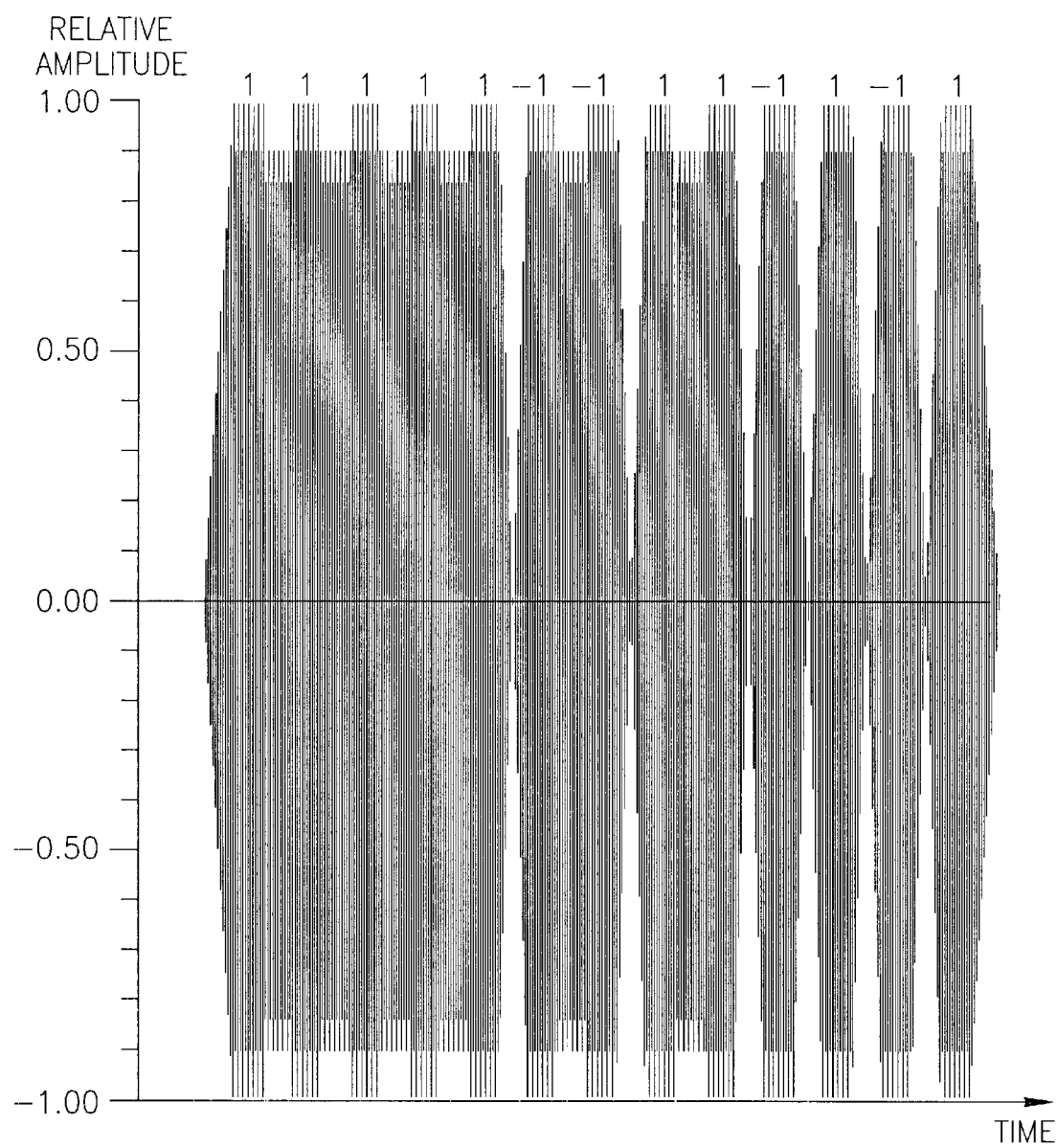
FIG. 4 is a plot illustrating the output impulse response of the SAW resonator device.

Note also that the SAW correlator device of the present invention is a bidirectional device. The output of the correlator depends on the direction of signal flow. During transmit, the differential output signal is given by the plot shown in FIG. 4. This plot illustrates the impulse response of the SAW correlator device that is generated during transmission. The relative amplitude is plotted versus time. Along the top of the plot are indications (i.e.,1 or −1) of the phase inversion as performed in accordance with the 13 comb-like elements 306. A '1' indicates no phase inversion and a '−1' indicates a 180 degree phase inversion. The 13 elements are configured to generate the 13 bit Barker code $\{1, 1, 1, 1, 1, -1, -1, 1, 1, -1, 1, -1, 1\}$ that is used in the RF modem. For example, a phase inversion occurs between the fifth and sixth comb element (i.e.,1 to −1). Assuming a chip rate of 20 Mcps.(i.e.50 ns/chip), the 13 chip spreading code can be transmitted in 650 ns.

Each bit of the output transducer may be implemented using a plurality of cells. Each cell may be implemented with electrodes having alternating polarities $\{-1, 1\}$ as well as with combinations of isolated or shorted electrodes. The number of electrodes making up each bit may comprise 150 to 250. The operating center frequency $f_o$ of the correlator (e.g., 915 MHz) is determined by the period of the location of the electrodes and the alternation of their polarities. Note that if V is the effective velocity of the SAW, than the value $L=V/f_o$ is the resonant wavelength. The radiated SAW has a resonance for the discrete values of $S_e$ which is the number of electrodes displaced in one period L. The value of $S_e$ may be equal to 2, 3, 4, 3/2, 4/3, etc.

The 13-bit coded output pulse characteristics of the SAW correlator may be represented by $h_0(t)$. The desired H(t) can be calculated as a convolution of $h_1(t)$ and $h_2(t)$ [$h_1(t)*h_2(t)$] representing the impulse response of the output and input transducer, respectively. The transducers can be adapted such that $h_1(t)$ is similar to the 13-bit code [+, +, +, +, +, −, −, +, +, −, +, −, +] and $h_2(t)$ is a short uniform signal. The delay for $h_2(t)$ must be shorter than one bit of $h_1(t)$.

Receive Path

The receive path of the RF modem will now be described in more detail. With reference to FIG. 1, the signal received by the antenna 36 is input to Tx/Rx switch 34. All three Tx/Rx switches 22, 30, 34 are configured during receive mode to create the receive path for the signal. The signal output of the switch 34 is band pass filtered by BPF 38. The filter 38 may comprise a relatively simple 2-pole LC filter having a bandwidth of at least 20 MHz. The signal output of the filter is then amplified via a first low noise amplifier (LNA) 40. The LNA 40 is preferably adapted to have a gain of approximately 20 dB, noise figure (NF) of approximately 2 to 3 dB and a dynamic range of approximately 80 dB.

The signal output of the LNA 40 is input to the SAW correlator via Tx/Rx switch 30 and tuning/impedance matching circuit 28. The correlator functions to despread the received signal from the original code sequence 650 ns wide to a relatively narrow pulse approximately 50 ns wide. The output of the correlator is then amplified by a second LNA 42 after passing through Tx/Rx switch 22 and tuning/impedance matching circuit 24. The second LNA 42 has similar characteristics as that of the first LNA 40 described in more detail hereinabove. The 20 dB gain of the second LNA functions to compensate for the relatively large insertion loss of the correlator.

The signal output of the LNA is input to a peak detector circuit comprising a fast peak detector 44 and a slow peak detector 46. Both peak detectors can be constructed using techniques well known to those skilled in the electrical arts. The fast peak detector functions to track the peak of the input signal using relatively little averaging. The slow peak detector is adapted to average the input signal so as to generate a slowly varying reference signal. The output of the fast peak detector circuit 44 is input to the non-inverting input of a Schmitt trigger comparator 48 while the reference signal output of the slow peak detector circuit 46 is input to the inverting input of the comparator. The output of the comparator 48 forms the DATA OUT signal which, in this example, is input to the host 12 for further processing, e.g., link and higher layer communications processing. The host functions to make one or more decisions on the data in accordance with the desired modulation and communication scheme.

In accordance with the RF modem of the present invention, there is no requirement of a linear detector since all that is required is that the received pulse be detected. Thus, although a linear detector may be used, a non-linear detector enables the construction of a simpler, lower current consumption and less expensive peak detector. Depending on the application, the envelope of the received signal may be detected using either a linear or non-linear detector. The fast and slow detectors, in combination with the comparator, are operative to perform thresholding of the received signal and output digital binary data.

Note that the output of the comparator is a digital pulse that is processed by the host. The host can be configured (i.e., programmed) to implement numerous types of communication schemes, e.g., OOK, PWM, etc. Some examples of communication schemes are provided hereinbelow.

Spread Spectrum Code Sequence

The actual code used to configure the SAW correlator device 26 is important to the operation of the system. The spreading code sequence is preferably chosen, however, so as to maximize one or more desirable characteristics including, but not limited to, autocorrelation, noise immunity, transmit spectrum and low intersymbol interference (ISI). In the United States, for transmission in the ISM band, the FCC requires that the code sequence comprise 10 or more chips and that the system exhibit a processing gain of greater than or equal to 10 dB. Therefore, the present invention utilizes a short code sequence that is close to the FCC minimum.

Although numerous different spread spectrum code sequences and other functions, such as linear FM, may be used with the present invention, the spread spectrum code selected is from the class of well known codes known as Barker codes. These codes are characterized as having good autocorrelation properties. The specific Barker code sequence used {1111100110101} exhibits good spectral flatness and low off correlation values. Note that the code sequence is 13 chips in length thus providing a margin of 3 chips over the FCC minimum.

Matched Filter/Correlator

Figure 5:
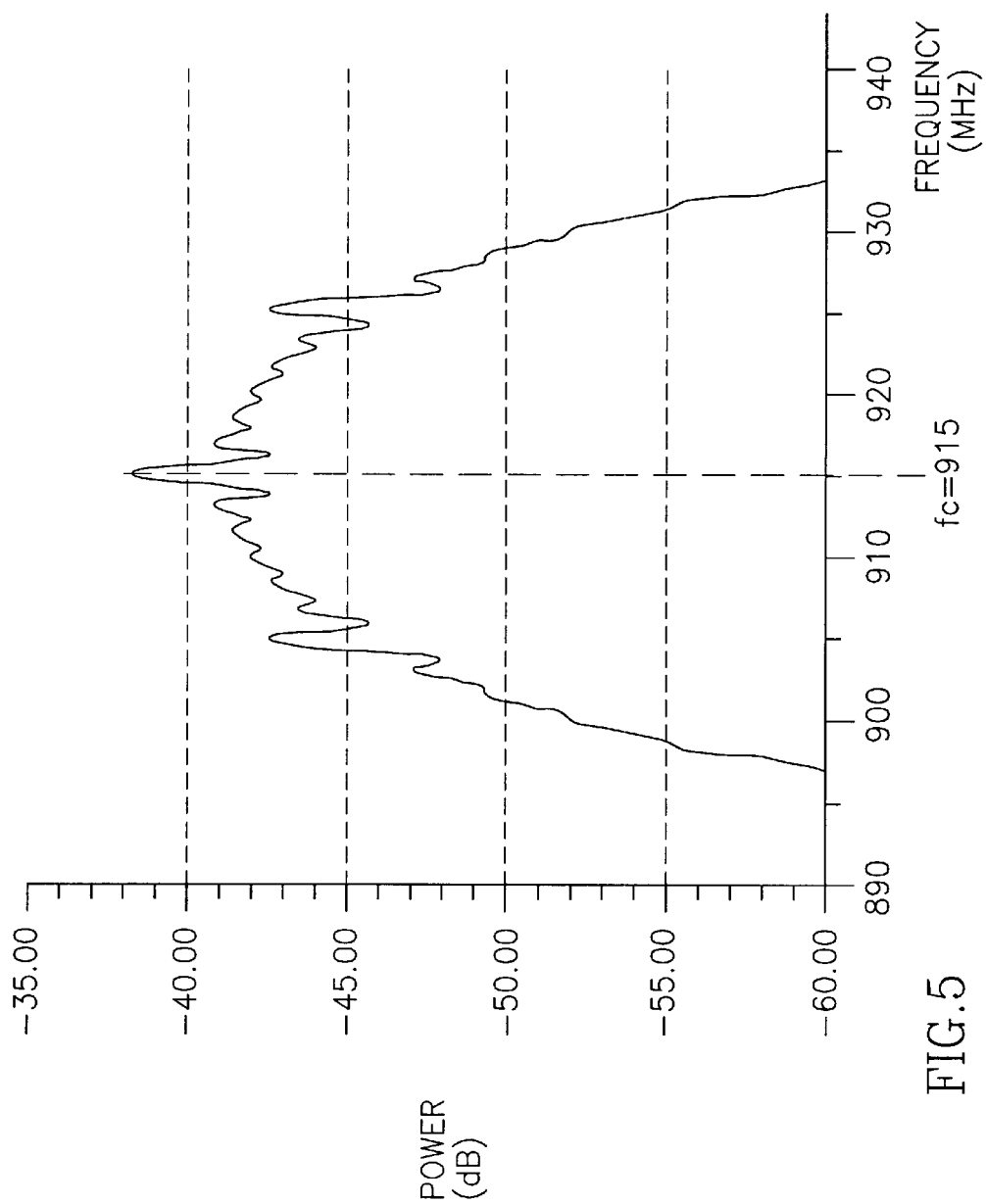
FIG. 5 is a plot illustrating the magnitude of the frequency response of the SAW device used in the RF modem.
Figure 6:
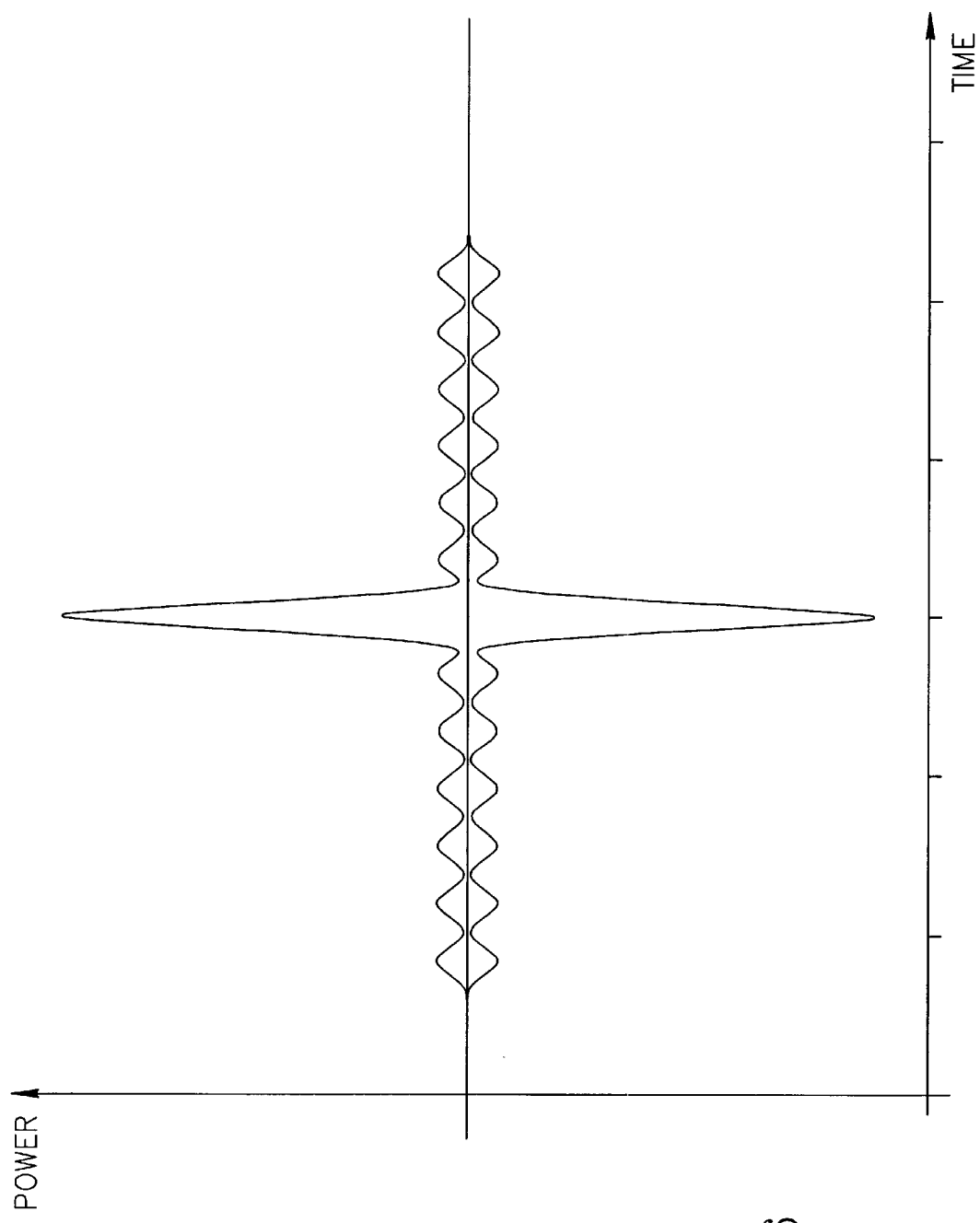
FIG. 6 is a plot illustrating the autocorrelation of the SAW correlator device.

The correlator coefficients are +1 for 1's and −1 for 0's whereby a 13 chip spreading code results in the following coefficients used in the construction of the SAW correlator: +1, +1, +1, +1, +1, −1, −1, +1, +1, −1, +1, −1, +1. A plot illustrating the frequency response of the SAW device used in the RF modem is shown in FIG. 5. The power in dB is plotted versus frequency. The frequency response is adapted to cover the ISM band (i.e., 902 to 928 MHz). The time representation of the frequency response, represented by h(t), is used to calculate the autocorrelation function a(t) whereby a(t)=h(t)* h(−t), i.e. the convolution of h(t) and h(−t). A plot illustrating the autocorrelation of the SAW correlator device is shown in FIG. 6. Each lobe of the autocorrelation is approximately 50 ns wide. The processing gain ratio is at least 11 dB=10*log10(13). Note that the 13 peaks or lobes (12 small peaks with one large peak in the center) correspond to the 13-bit Barker code configured in the correlator.

It is important to note that the present invention is not meant to be limited to the use of a BPSK SAW correlator. In general any type of pulse compressor may be used in the modem. More particularly, the invention may be performed using any suitable spread spectrum SAW technique such as BPSK, linear FM and non-linear FM.

Figure 7:
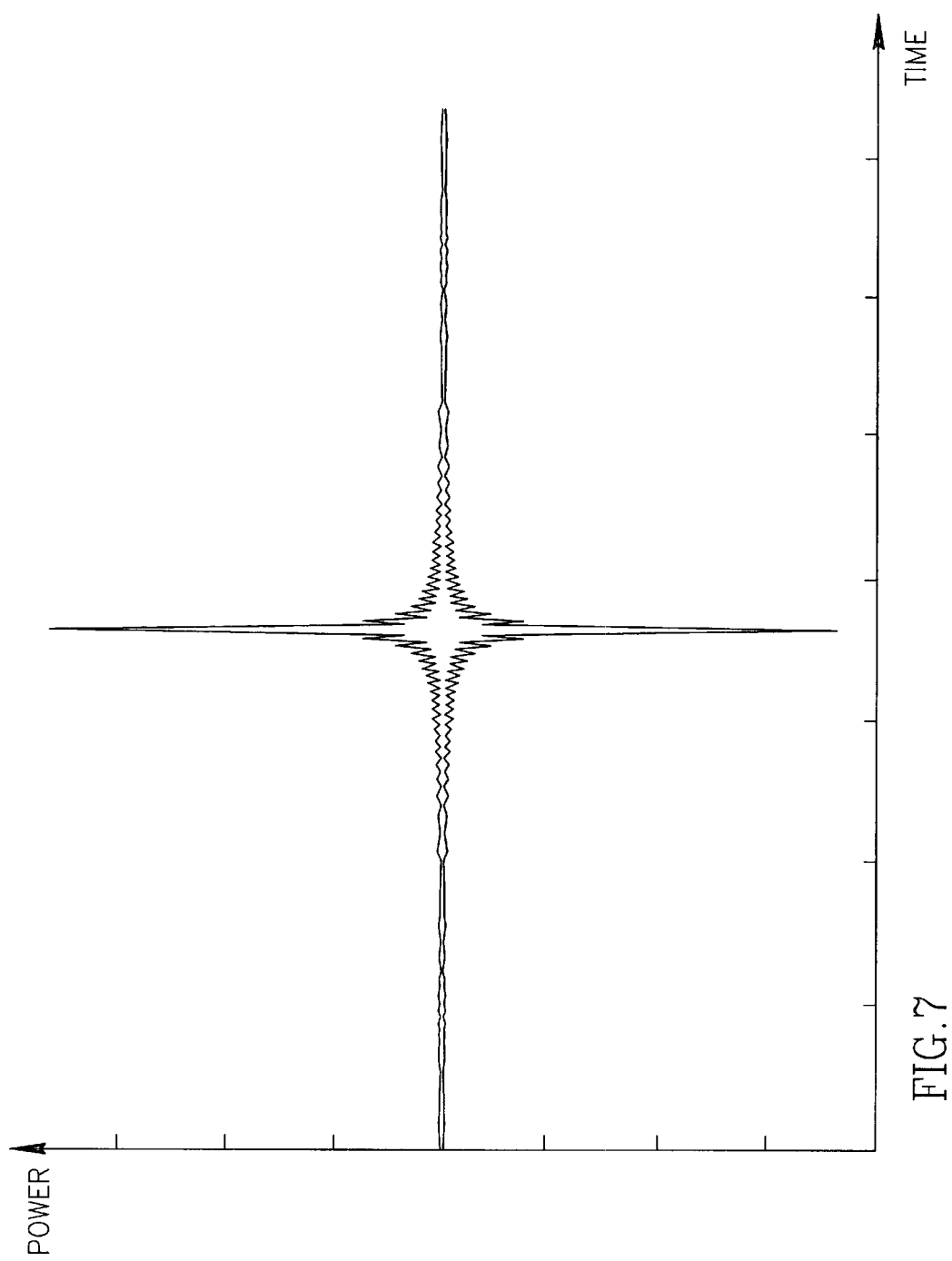
FIG. 7 is a plot illustrating the autocorrelation of a linear FM SAW correlator device.

In the case where the pulse compression used is linear FM, the signal can be expressed as follows in Equation 1.

$$V(t)=\sin[2\pi f(t)t] \tag{1}$$

where the frequency function $f(t)=a \cdot t$ is a linear rising function with time. A plot illustrating the autocorrelation of an example linear FM SAW correlator device is shown in FIG. 7. It is noted that the shape of the linear FM autocorrelation function differs from that of the BPSK autocorrelation function in that the envelope of the linear FM function falls off gradually.

In the case where the pulse compression used is linear FM, the signal can be expressed as in Equation 1 above but wherein the frequency function $f(t)=a \cdot t^2$ is a non-linear rising function with time. Note that other functions of frequency are also suitable as well.

Example Communication Schemes

As described previously, the RF modem is constructed generically as the basis for the physical layer for any number of modulation types and communication schemes. In particular, the RF modem is adapted to perform any type of digital pulse modulation. Three examples of digital pulse modulation will now be presented. The three modulation types include OOK, PWM and PPM modulations.

OOK Modulation

Figure 8:
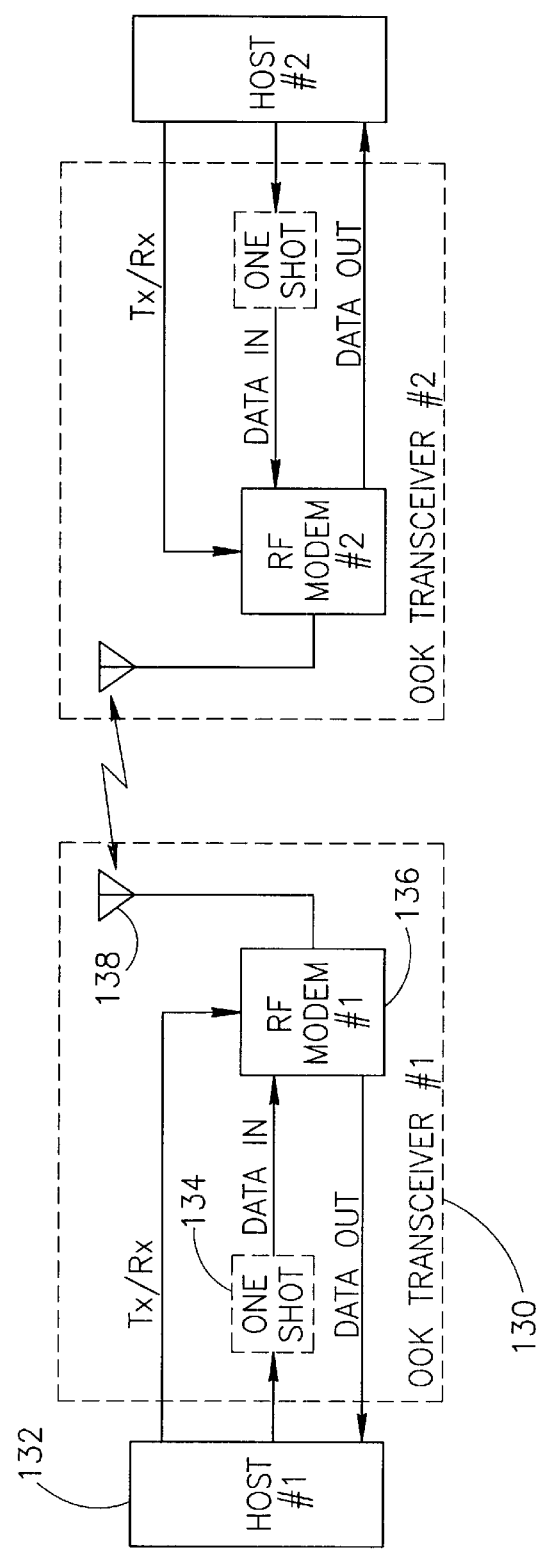
FIG. 8 is a block diagram illustrating an OOK communications system constructed using the RF modem of the present invention.

A block diagram illustrating an OOK communications system constructed using the RF modem of the present invention is shown in FIG. 8. The system comprises two OOK transceivers 130, labeled OOK transceiver #1 and #2 that are adapted to communicate half duplex using RF. OOK transceiver #1 comprises one shot 134, RF modem 136, labeled RF modem #1, and antenna 138. OOK transceiver #2 is similarly constructed and comprises a host #2, one shot device, RF modem #2 and an antenna. A first host 132, labeled host #1, is coupled to send data to and receive data from the OOK transceiver #1. A second host #2 is adapted to send data to and receive data from the OOK transceiver #2. Both hosts are adapted to drive the Tx/Rx control line to the modem.

In operation, the host transmits data by outputting the data to the RF modem #1. The data comprises a pulse to represent a '1', for example, and the absence of a pulse to represent a '0'. The RF modem is constructed in accordance with the present invention and is adapted to receive a pulse on the order of 50 ns. If the host cannot generate a pulse of such short width, a one shot device 134 can be used. The pulse is then spread, via the SAW correlator, to a spreading sequence as described above, and transmitted over the antenna 138.

The signal is received by the antenna of OOK transceiver #2 and input to the RF modem #2. The RF modem functions to de-spread the signal and output a 50 ns pulse to host #2 for further processing. If host #2 is not fast enough to input a 50 ns pulse, a second one shot or latch (not shown) can be used between the RF modem and the host.

PWM Modulation

Figure 9:
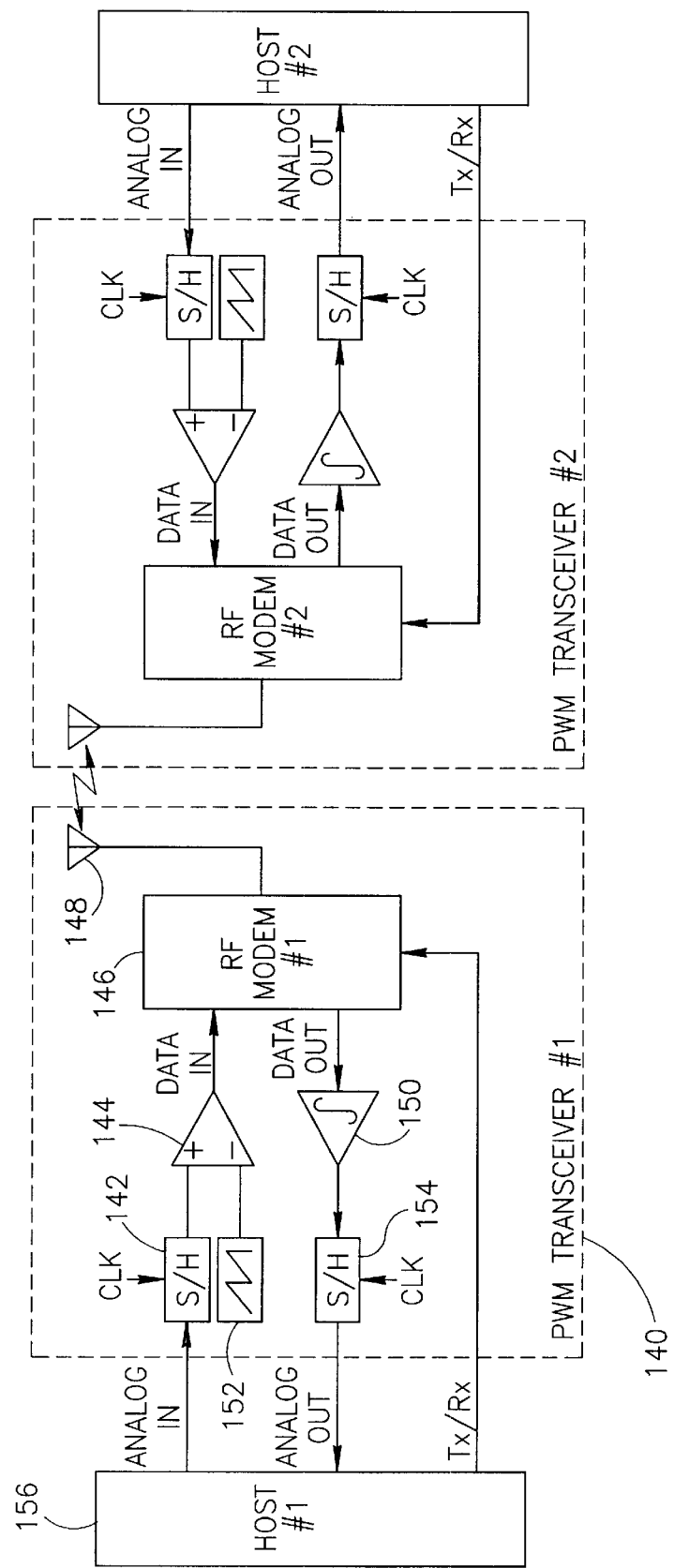
FIG. 9 is a block diagram illustrating a PWM communications system constructed using the RF modem of the present invention.

A block diagram illustrating a PWM communications system constructed using the RF modem of the present invention is shown in FIG. 9. The system comprises two PWM transceivers 140, labeled PWM transceiver #1 and #2 that are adapted to communicate half duplex using RF. PWM transceiver #1 comprises sample and hold (S/H) circuits 142, 154, saw tooth (ramp) signal generator 152, comparator 144, integrator 150, RF modem 146, labeled RF modem #1, and antenna 148. PWM transceiver #2 is similarly constructed and comprises S/H circuits, ramp function generator, comparator, RF modem #2, integrator and an antenna. A first host 156, labeled host #1, is coupled to send data to and receive data from the PWM transceiver #1. A second host #2 is adapted to send data to and receive data from the PWM transceiver #2. Both hosts are adapted to drive the Tx/Rx control line to the modem.

Figure 10:
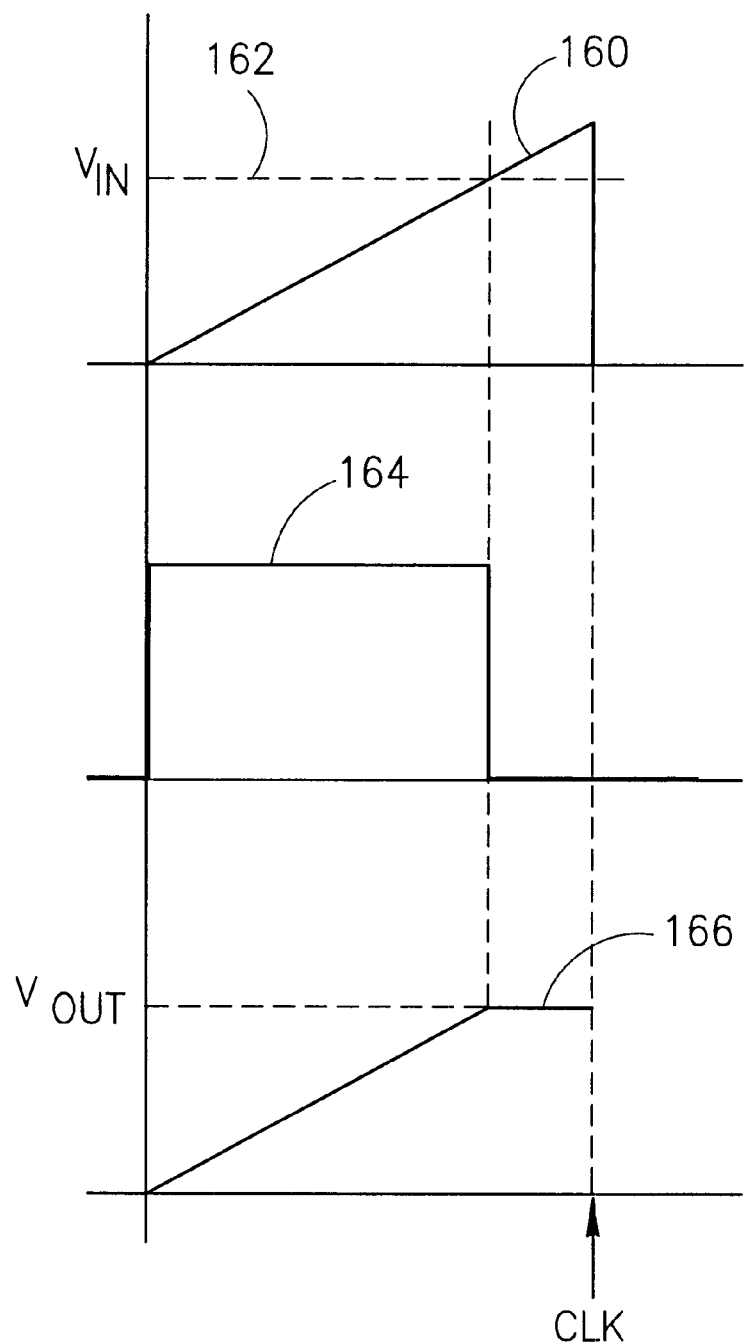
FIG. 10 is a diagram illustrating several signal waveforms of the PWM transceiver.

With reference to FIGS. 9 and 10, in operation, the host transmits data by outputting the signal ANALOG IN to the S/H circuit 142. Note that the data may be either digital or analog and provided by means other than a host. In the example presented herein, the transceiver is adapted to transmit and receive analog signals but could be adapted by one skilled in the art to transmit and receive digital signals. The analog signal $V_{IN}$ 162 is sampled by the S/H circuit and input to the non-inverting input of comparator 144. The output 160 of the saw tooth or ramp function generator is input to the inverting input of the comparator. The period of the ramp function signal is preferably no wider than 150 ns to avoid problems associated with limitations of the Barker code. The output 164 of the comparator is high until the amplitude of the ramp exceeds the input signal at which point the output is brought low.

The DATA IN pulse is input to the RF modem and transmitted to PWM transceiver #2 via antenna 148. The pulse width of the transmit spreading waveform is varied in accordance with the pulse width of the input signal. For example, a 20 ns wide input pulse yields a receive signal whose peak pulse width is approximately 20 ns. A 100 ns wide input pulse yields a receive signal whose peak pulse width is approximately 100 ns. Note, however, that widening of the Barker code spreading sequence is limited. The increase in pulse width is limited to approximately 2 chips in duration (assuming a chip rate of 20 Mcps this corresponds to 150 ns).

The signal is received by the antenna of OOK transceiver #2 and input to the RF modem #2. The RF modem functions to de-spread the signal and output a pulse whose width is in accordance with the pulse width of the input signal. The output of the RF modem is input to an integrator 150 which functions to integrate the receive signal. The output signal $V_{OUT}$ 166 of the integrator is sampled by S/H 154. The output of the S/H circuit forms the ANALOG OUT signal that is then input to the host or other means for further processing.

It is important to note that the ramp function generator and the clocks provided to the S/H circuits 142, 154 be synchronized such that a low to high transition of the ramp function corresponds with a symbol period of the data, i.e., ANALOG IN signal, to be transmitted.

PPM Modulation

Figure 11:
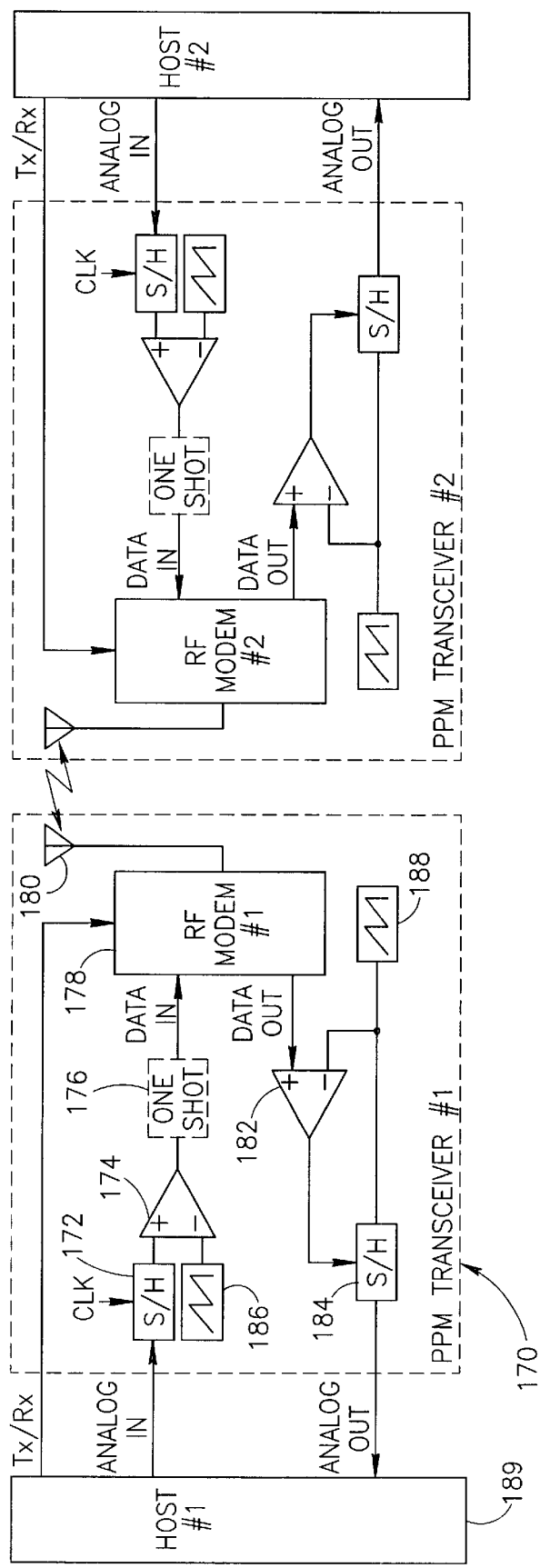
FIG. 11 is a block diagram illustrating an PPM communications system constructed using the RF modem of the present invention.

A block diagram illustrating an PPM communications system constructed using the RF modem of the present invention is shown in FIG. 11. The system comprises two PPM transceivers 170, labeled PPM transceiver #1 and #2 that are adapted to communicate half duplex using RF. PPM transceiver #1 comprises sample and hold (S/H) circuits 172, 184, saw tooth (ramp) signal generators 186, 188, comparators 174, 182, one shot 176, RF modem 178, labeled RF modem #1, and antenna 180. PPM transceiver #2 is similarly constructed and comprises S/H circuits, comparators, ramp function generators, one shot, RF modem #2 and an antenna. A first host 189, labeled host #1, is coupled to send data to and receive data from the PPM transceiver #1. A second host #2 is adapted to send data to and receive data from the PPM transceiver #2. Both hosts are adapted to drive the Tx/Rx control line to the modem.

Figure 12:
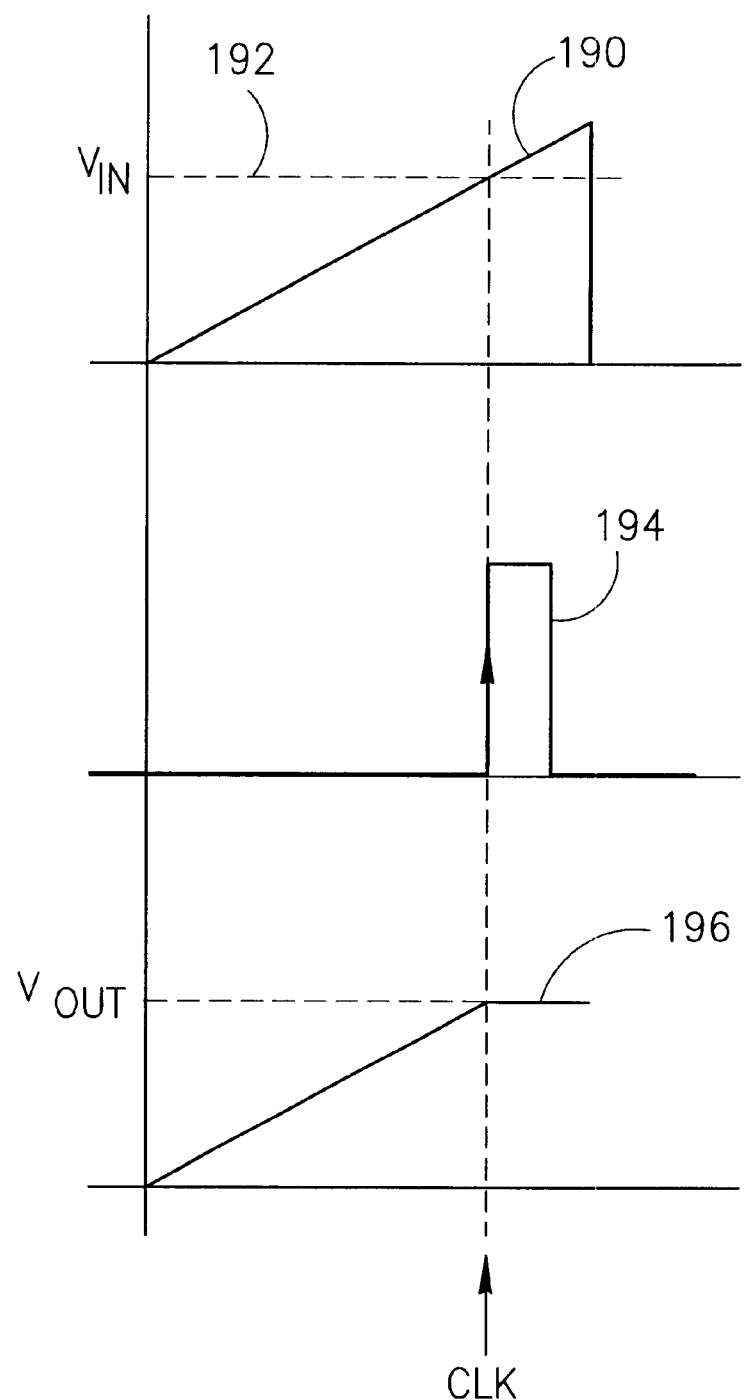
FIG. 12 is a diagram illustrating several signal waveforms of the PPM transceiver.

With reference to FIGS. 11 and 12, in operation, the host transmits data by outputting the signal ANALOG IN to the S/H circuit 172. Note that the data may be either digital or analog and provided by means other than a host. In the example presented herein, the transceiver is adapted to transmit and receive analog signals but could be adapted by one skilled in the art to transmit and receive digital signals. The analog signal $V_{IN}$ 192 is sampled by the S/H circuit and input to the non-inverting input of comparator 174. The output 190 of the saw tooth or ramp function generator is input to the inverting input of the comparator. The output of the comparator is high until the amplitude of the ramp exceeds the input signal at which point the output is brought low. The output of the comparator is input to a one shot device 176 that is triggered by the falling edge of the output of the comparator. The one shot generates a pulse 194 uniform in width, e.g., 50 ns that is then input to the RF modem for transmission to PPM transceiver #2 via antenna 180.

The pulse position of the spreading waveform transmitted varies in accordance with the time position of the DATA IN signal. The signal is received by the antenna of OOK transceiver #2 and input to the RF modem #2. The RF modem functions to de-spread the signal and output a pulse whose position varies in accordance with the pulse position of the input signal. The output of the RF modem is input to comparator 182. The second input is the output of ramp function generator 188.

In operation, the output of the ramp signal is sampled by the S/H circuit 184 until the pulse arrives and is output by the RF modem as the DATA OUT signal. The output of the comparator forms the clock signal to the S/H circuit. The input to the S/H 184 increases until the output of the RF modem exceeds the ramp signal. This corresponds to the RF modem outputting a pulse at a point in time corresponding to the receiving of the pulse from the transmitter. At this point, the S/H is clocked and the signal $V_{OUT}$ 196 output of the S/H is set equal to its input. The output of the S/H circuit forms the ANALOG OUT signal that is then input to the host or other means for further processing.

It is important to note that the ramp function generator and the clock provided to S/H circuit 186 be synchronized such that a low to high transition of the ramp function corresponds with a symbol period of the data, i.e., ANALOG IN signal, to be transmitted. Synchronization schemes are known in the art for synchronizing the ramp signal with the received signal such that data can be received.

In a PPM communication system, the critical performance indicator is the ratio β of symbol period to pulse width as given by Equation 2 below.

$$\beta = T/\tau \quad (2)$$

The signal to noise ratio (SNR) is given by Equation 3 below.

$$SNR = \frac{\frac{\beta^2}{3} \cdot \frac{E_b}{N_o}}{1 + \frac{2}{3}\beta^2(\beta-1)\sqrt{\frac{E_b}{N_o\pi}}\, e^{-\frac{E_b}{4N_o}}} \quad (3)$$

wherein $E_b$ is the energy per bit and $N_o$ is the noise level. If it is assumed that the link budget has a fixed energy per bit $E_b$, the performance is therefore dictated by the value of β. As the pulse width narrows, the SNR increases and vice versa. For example, if the pulse width τ used in transmission is approximately 50 ns, the symbol period T is 1000 ns, resulting in a β of 20, the $E_b$, equal to −70 dBm and the $N_o$ equal to −114+10*log(20)=−100 dBm, the SNR of the link is approximately 52 dB.

Multiple Correlators

To achieve higher communication bit rates, additional correlators and associated circuitry can be added to the modem of FIG. 1. In general, any number of correlators can be added wherein the correlator function or code of each correlator, represented by $f_i(t)$, is orthogonal with the functions of all other correlators. When the functions (i.e., codes) of each correlator are orthogonal to each other, each correlator transmits and receives independently of the other. A sufficient number of functions must be found, however, that satisfy the following criteria.

$$\langle f_i(t), f_j(t) \rangle = 0 \text{ for all } i \neq j \quad (4)$$

In other words, the cross correlation of all codes with each other must be very low, i.e., ~0. As an example, one skilled could easily generate multiple linear FM codes that are substantially orthogonal to each other and having cross correlations with each other of nearly zero.

To aid in understanding the principles of the present invention, an example modem is presented comprising N correlators. A modem can be constructed using any number N of correlators as long as the above-described criterion is met. The result of using multiple correlators is to increase the effective communication bit rate. Considering the RF modem of FIG. 1 having a bit rate of 1.5 Mbps as an example, the use of N correlators results in a total bit rate of N×1.5 Mbps.

Figure 13:
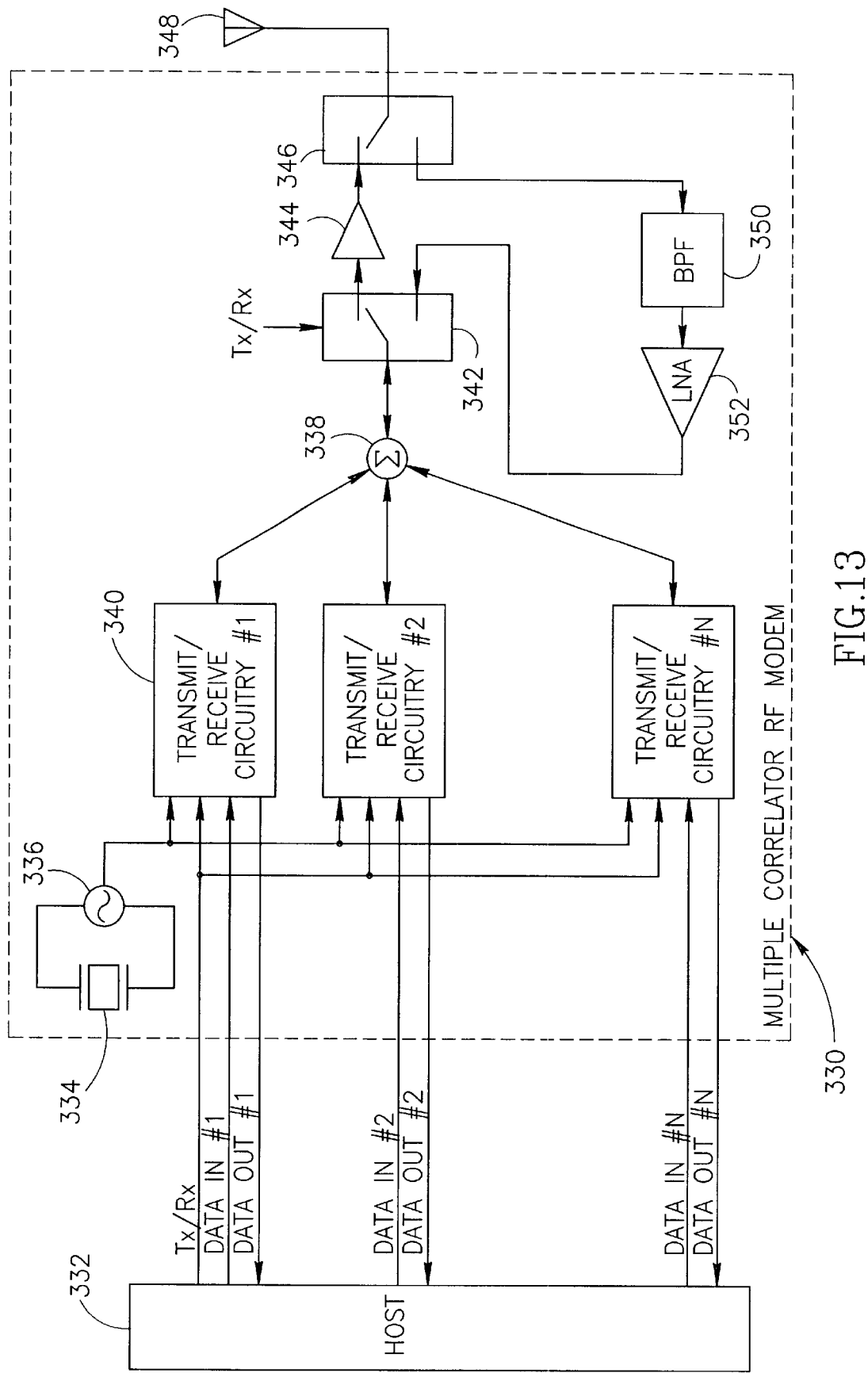
FIG. 13 is a block diagram illustrating an RF modem constructed in accordance with the present invention having more than one correlator.

A block diagram illustrating an RF modem constructed in accordance with the present invention having multiple correlators is shown in FIG. 13. The modem, generally referenced 330, is constructed similarly to the modem of FIG. 1 with the exception that there are now N SAW correlators. The modem 330 comprises a single oscillator circuit 336 coupled to a SAW resonator 334. The output of the oscillator 336 feeds a plurality of transmit/receive circuits 340, labeled transmit/receive circuit #1 through #N. A host 332 provides the data to be transmitted to each transmit/receive circuit 340 on separate DATA IN signal lines, labeled DATA IN #1 through DATA IN #N. Similarly, the output data from each circuit 340 is input to the host 332 via separate DATA OUT signal lines, labeled DATA OUT #1 through DATA OUT #N. The host 332 also provides the Tx/Rx signal to each transit/receive circuit 340.

A signal line from each transmit/receive circuit 340 is connected to an RF power/splitter combiner 338. The device 338 functions as a combiner in the transmit direction and as a splitter in the receive direction. The power splitter/combiner is coupled to an RF switch 342 that functions to divide the signal into transmit and receive paths. Another RF switch 356 is coupled to the antenna 348.

Figure 14:
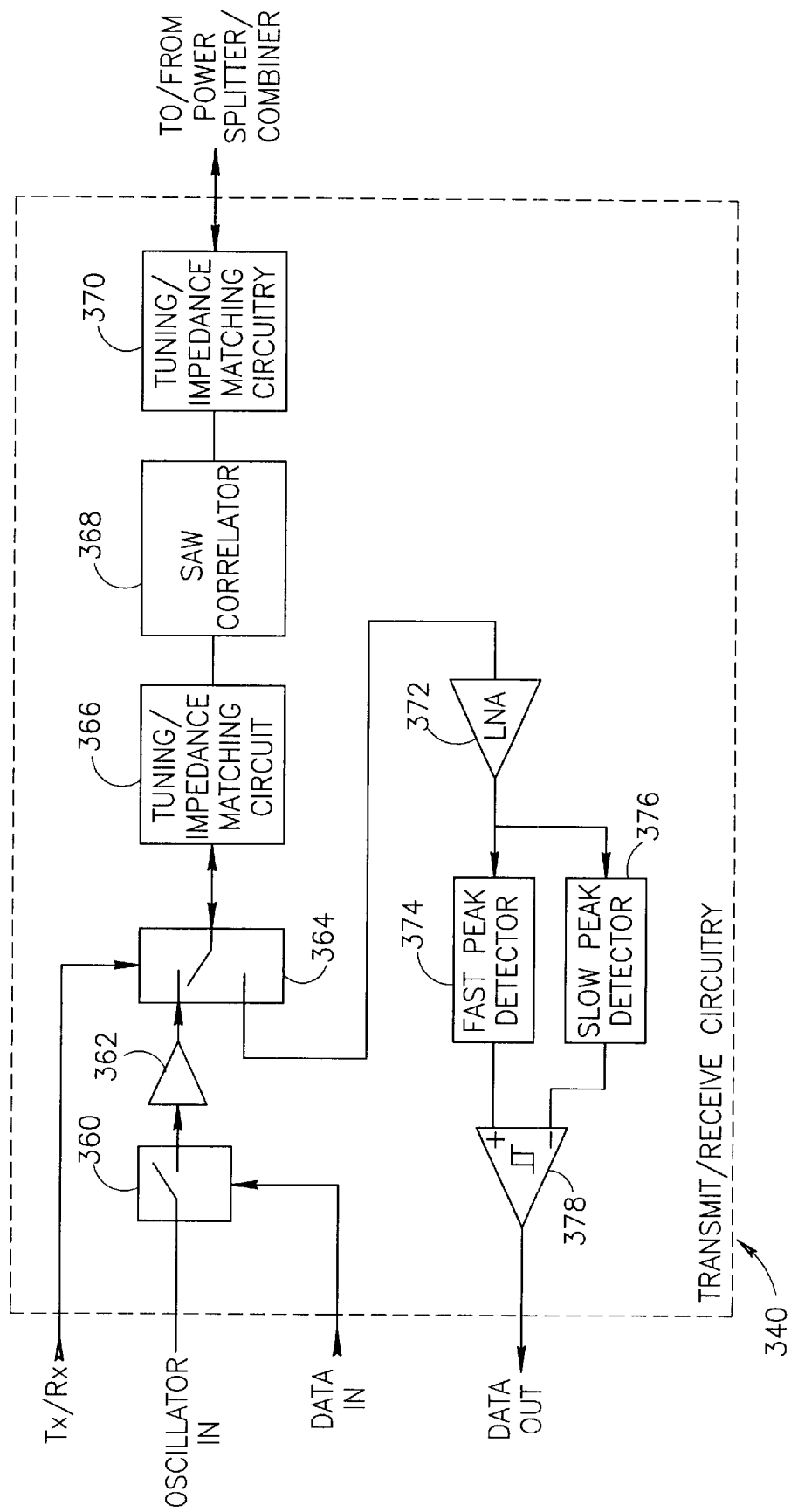
FIG. 14 is a block diagram illustrating the transmit/receive circuit of the RF modem of FIG. 13 in more detail.

A block diagram illustrating the transmit/receive circuit of the RF modem of FIG. 13 in more detail is shown in FIG. 14. The transmit path comprises an RF switch 360 that functions to gate the oscillator signal via the DATA IN signal from the host, amplifier 362, Tx/Rx switch 364, tuning/impedance matching circuits 366, 370 and SAW correlator 368. The output of the tuning/impedance matching circuit 370 is input to the power splitter/combiner 338 (FIG. 13).

The receive path comprises tuning/impedance matching circuits 370, 366, SAW correlator 368, Tx/Rx switch 364, LNA 372, fast peak detector 374, slow peak detector 376 and Schmitt comparator 378. The output of the comparators 378 forms the DATA OUT signal and is input to the host 332.

The components of the transmit/receive circuit 340 function similarly as like components of the RF modem of FIG. 1. During transmitting, the host 332 provides Tx data to each transmit/receive circuit 340 via the respective DATA IN signal lines. Each correlator is configured with a unique function or code thus preventing interference between the signals generated. The resulting plurality of N signals are combined by the RF power combiner/splitter 338. The combined signal is then amplified by output amplifier 344 and transmitted via antenna 348.

In the receive path, the received signal is fed from antenna 348 through Tx/Rx switch 346 to band pass filter 350. The filtered signal is then amplified by LNA 352 before being split by RF power splitter/combiner 338 into N signals. The received signal is input to each correlator which outputs a pulse in accordance with the function configured therein. The pulse is input to separate peak detectors in each circuit 340 to generate N DATA OUT signals. The resulting N DATA OUT signals are input to the host 332.

While the invention has been described with respect to a limited number of embodiments, it will be appreciated that many variations, modifications and other applications of the invention may be made.

What is claimed is:

1. A direct sequence spread spectrum radio frequency (RF) modem, comprising:

an oscillator having a resonator and adapted to generate an oscillator signal, the center frequency of said oscillator determined by the center frequency of said resonator;

switching means for gating said oscillator signal in accordance with input data to be transmitted so as to generate a series of pulses;

spreading means for spreading the pulses output of said switching means with a spreading code sequence waveform so as to generate a spread spectrum transmission signal;

means for transmitting said spread spectrum transmission signal;

means for receiving said spread spectrum transmission signal;

correlator means adapted to de-spread said spread spectrum transmission signal in accordance with said code sequence so as to generate a correlator signal;

detection means for detecting an envelope of said correlator signal so as to generate a detection signal; and decision means for applying a threshold to said detection signal so as to generate an output data signal therefrom.

2. The modem according to claim 1, wherein said resonator comprises a surface acoustic wave (SAW) resonator.

3. The modem according to claim 1, wherein said switching means comprises a plurality of switches coupled in series and operative to provide a high level of electrical isolation.

4. The modem according to claim 3, wherein said plurality of switches comprises a plurality of Field Effect Transistor (FET) switches.

5. The modem according to claim 1, wherein said spreading means comprises a surface acoustic wave (SAW) matched filter/correlator.

6. The modem according to claim 1, wherein said spreading code sequence comprises a Barker code series sequence.

7. The modem according to claim 6, wherein said Barker code series sequence comprises a 13-chip Barker sequence $\{1, 1, 1, 1, 1, -1, -1, 1, 1, -1, 1, -1, 1\}$.

8. The modem according to claim 1, wherein said means for transmitting comprises:

an output amplifier for amplifying said spread spectrum transmission signal; and an antenna coupled to the output of said output amplifier.

9. The modem according to claim 1, wherein said means for receiving comprises:

an antenna adapted to receive said spread spectrum transmission signal;

a band pass filter coupled-to said antenna; and a low noise amplifier coupled to the output of said band pass filter.

10. The modem according to claim 1, wherein said correlator means comprises a surface acoustic wave (SAW) matched filter/correlator.

11. The modem according to claim 10, wherein said SAW matched filter/correlator is configured with a Barker code series sequence.

12. The modem according to claim 11, wherein said Barker code series sequence comprises a 13-chip Barker sequence $\{1, 1, 1, 1, 1, -1, -1, 1, 1, -1, 1, -1, 1\}$.

13. The modem according to claim 1, wherein said spreading means and said correlator means share a surface acoustic wave (SAW) correlator adapted to be used half duplex for transmission and receiving.

14. The modem according to claim 1, wherein:

said resonator means comprises a surface acoustic wave (SAW) resonator;

said spreading means and said correlator means share a surface acoustic wave (SAW) correlator adapted to be used half duplex for transmission and receiving; and wherein said SAW resonator and said SAW correlator are constructed on the same monolithic substrate.

15. The modem according to claim 1, wherein said detection means comprises:

a slow peak detector adapted to generate a slowly varying reference signal; and a fast peak detector adapted to track the envelope of said correlator signal and to generate said detection signal therefrom.

16. The modem according to claim 1, wherein said decision means is adapted to generate a binary output signal in accordance with said detection signal applied against said threshold.

17. The modem according to claim 16, wherein said detection means is adapted to generate said threshold dynamically in accordance with said correlator signal.

18. A method of modulating and demodulating a direct sequence spread spectrum signal, said method comprising the steps of:

generating an oscillator signal utilizing a resonator wherein the frequency of oscillation is determined by the center frequency of said resonator;

gating said oscillator signal in accordance with input data to be transmitted so as to generate a series of pulses;

spreading said pulses utilizing a spreading code sequence waveform so as to generate a spread spectrum transmission signal;

transmitting said spread spectrum transmission signal;

receiving said spread spectrum transmission signal;

de-spreading said spread spectrum transmission signal in accordance with said code sequence so as to generate a correlator signal;

detecting an envelope of said correlator signal so as to generate a detection signal; and applying a threshold to said detection signal so as to generate an output data signal therefrom.

19. A direct sequence spread spectrum radio frequency (RF) modem, comprising:

an oscillator having a resonator and adapted to generate an oscillator signal, the center frequency of said oscillator determined by the center frequency of said resonator;

a plurality of N transmit/receive circuits, each said transmit/receive circuit comprising:

switching means for gating said oscillator signal in accordance with input data to be transmitted so as to generate a series of pulses;

spreading means for spreading the pulses output of said switching means with a spreading code sequence waveform so as to generate a spread spectrum transmission signal;

correlator means adapted to de-spread a spread spectrum receive signal in accordance with said code sequence so as to generate a correlator signal;

detection means for detecting an envelope of said correlator signal so as to generate a detection signal; and decision means for applying a threshold to said detection signal so as to generate an output data signal therefrom;

wherein the correlator in each transmit/receive circuit is configured with a unique function substantially orthogonal to functions in other correlators;

means for combining and transmitting the N spread spectrum transmission signals generated by said N transmit/receive circuits as a combined spread spectrum transmission signal;

means for receiving and splitting said combined spread spectrum transmission signal into N spread spectrum receive signals; and wherein N is a positive integer.

20. The modem according to claim 19, wherein said resonator comprises a surface acoustic wave (SAW) resonator.

21. The modem according to claim 19, wherein said switching means comprises a plurality of switches coupled in series and operative to provide a high level of electrical isolation.

22. The modem according to claim 21, wherein said plurality of switches comprises a plurality of Field Effect Transistor (FET) switches.

23. The modem according to claim 19, wherein said spreading means comprises a surface acoustic wave (SAW) matched filter/correlator.

24. The modem according to claim 19, wherein said spreading code sequence comprises a Barker code series sequence.

25. The modem according to claim 19, wherein said spreading code sequence comprises a linear FM code.

26. The modem according to claim 19, wherein said means for transmitting comprises:

an output amplifier for amplifying said combined spread spectrum transmission signal; and an antenna coupled to the output of said output amplifier.

27. The modem according to claim 19, wherein said means for receiving comprises:

an antenna adapted to receive said spread spectrum transmission signal;

a band pass filter coupled to said antenna; and a low noise amplifier coupled to the output of said band pass filter.

28. The modem according to claim 19, wherein said correlator means comprises a surface acoustic wave (SAW) matched filter/correlator.

29. The modem according to claim 28, wherein said SAW matched filter/correlator is configured with a Barker code series sequence.

30. The modem according to claim 19, wherein said spreading means and said correlator means in each transmit/receive circuit share a surface acoustic wave (SAW) correlator adapted to be used half duplex for transmission and receiving.

31. The modem according to claim 19, wherein:

said resonator means comprises a surface acoustic wave (SAW) resonator;

each said spreading means and each said N correlator means share a surface acoustic wave (SAW) correlator adapted to be used half duplex for transmission and receiving; and wherein said SAW resonator and said N SAW correlators are constructed on the same monolithic substrate.

32. The modem according to claim 19, wherein said detection means comprises:

a slow peak detector adapted to generate a slowly varying reference signal; and a fast peak detector adapted to track the envelope of said correlator signal and to generate said detection signal therefrom.

33. The modem according to claim 19, wherein said decision means is adapted to generate a binary output signal in accordance with said detection signal applied against said threshold.

34. The modem according to claim 33, wherein said detection means is adapted to generate said threshold dynamically in accordance with said correlator signal.

35. The modem according to claim 19, wherein said means for combining the N spread spectrum transmission signals comprises an RF power combiner splitter.

36. The modem according to claim 19, wherein said means for splitting said combined spread spectrum signal comprises an RF power combiner splitter.

37. A method of modulating and demodulating N direct sequence spread spectrum signals, each direct sequence spread spectrum signal associated with one of N channels, said method comprising the steps of:

generating N oscillator signals utilizing a resonator wherein the frequency of oscillation is determined by the center frequency of said resonator;

for each channel:

gating each oscillator signal in accordance with input data for the $N^{th}$ channel to be transmitted so as to generate a series of pulses;

spreading said pulses utilizing a spreading code sequence waveform so as to generate a spread spectrum transmission signal, said spreading code sequence waveform for the $N^{th}$ channel substantially orthogonal with the spreading code sequence waveforms of all other channels;

de-spreading a spread spectrum transmission receive signal in accordance with said code sequence so as to generate a correlator signal;

detecting an envelope of said correlator signal so as to generate a detection signal;

applying a threshold to said detection signal so as to generate an output data signal for the $N^{th}$ channel therefrom;

combining and transmitting the N spread spectrum transmission signals as a combined spread spectrum transmission signal;

receiving and splitting said combined spread spectrum transmission signal into N spread spectrum receive signals; and wherein N is a positive integer.

* * * * *